US006630219B2

(12) United States Patent
Hirokane et al.

(10) Patent No.: US 6,630,219 B2
(45) Date of Patent: Oct. 7, 2003

(54) OPTICAL DISK AND RECORDING/REPRODUCING DEVICE

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 26 days.

(21) Appl. No.: 09/769,336

(22) Filed: Jan. 26, 2001

(65) Prior Publication Data

US 2001/0009709 A1 Jul. 26, 2001

(30) Foreign Application Priority Data

Jan. 26, 2000 (JP) ........................................ 2000-016674

(51) Int. Cl.⁷ ............................... B32B 3/02; G11B 7/24
(52) U.S. Cl. ................... 428/64.4; 428/64.1; 369/275.4
(58) Field of Search ............................... 428/64.4, 64.1; 369/275.4

(56) References Cited

U.S. PATENT DOCUMENTS

| 5,459,711 | A |  | 10/1995 | Ohta et al. |  |
| 5,470,694 | A |  | 11/1995 | Ohta et al. |  |
| 5,508,995 | A | * | 4/1996 | Moriya et al. | 369/275.4 |
| 6,064,644 | A | * | 5/2000 | Miyamoto et al. | 369/275.4 |

FOREIGN PATENT DOCUMENTS

| JP | 6-333240 A | 12/1994 |
| JP | 07153081 | 6/1995 |
| JP | 8-315426 A | 11/1996 |
| JP | 09017033 | 1/1997 |

* cited by examiner

Primary Examiner—Cynthia H. Kelly
Assistant Examiner—L. Ferguson
(74) Attorney, Agent, or Firm—Birch, Stewart, Kolasch & Birch, LLP

(57) ABSTRACT

In the present invention, in a pre-recorded information recording region on an optical disk capable of recording in both a land and a groove, a first address region is displaced off a second address region along the length of the track. Address information is stored by a first pit string P1 following a groove G1 in the first address region and by a second pit string P2 following a groove G2 in the second address region. The first pit string P1 and the second pit string P2 are adapted so that the gaps between pits constituting those strings in accordance with address information are equal to, or less than, the width of the pits measured in a radial direction of the disk. Thus, the present invention offers an optical disk and a recording/reproducing device which effect a stable tracking control.

28 Claims, 24 Drawing Sheets

OPTICAL DISK AND RECORDING/REPRODUCING DEVICE

FIELD OF THE INVENTION

The present invention relates to magneto-optical and other optical disks where a stable tracking control is effected by means of restraint of crosstalk which may occur in the information pre-recorded in the form of pit strings and changes in the track width, and also relates to recording/reproducing devices intended for use with these disks.

BACKGROUND OF THE INVENTION

Magneto-optical disks as rewritable optical recording media are already have been already developed from magneto-optical recording media and put into practical use. Stored data is deleted on these kinds of magneto-optical disks by a semiconductor laser emitting a light beam which is focused on the optical recording media to locally elevate the temperature of the magneto-optical recording media. To reproduce recorded data, a light beam is focused on the magneto-optical recording media with such an intensity that the data is not deleted, and the polarization of the reflected light is checked. To reproduce address information on these magneto-optical recording media, continuous pit strings are typically provided in advance in a recording track to form a spiral line or concentric lines on the disk substrate, and the quantity of reflected light is measured for changes which result from the provision of the pit strings.

Meanwhile, super-resolution magnetic reproduction has been developed based on a multilayered magnetic film. In addition, the reproduction resolution of super-resolution magneto-optical recording media has improved a lot. These are contributing factors in the great effort put in those researches about land and groove recording schemes whereby data is recorded and reproduced both in the groove region serving as a guide groove and in the land region serving as another guide groove. In the land and groove recording scheme, the land and the groove constitute individual recording tracks, and require separate sets of address bits.

Now reference is made to FIG. 20 which illustrates a structure of address bits disclosed in Japanese Laid-Open Patent Application No. 7-153081/1995 (Tokukaihei 7-153081 published on Jun. 16, 1995; hereinafter, "Laid-Open Patent Application 1"). Grooves (G1, G2) and lands (L1, L2) are provided to form spiral lines with a substantially identical width. A first pit string P1 representing first address information is provided following the groove G1, to form convexities and concavities in a first address region. A second pit string P2 is provided following the groove G2 in a second address region that is displaced along the length of the track off the first address region where the first pit string P1 is provided.

Now, the following will discuss how to reproduce the address information. In a case when a light beam spot BG1 scans the groove G1 relatively as a result of the rotation of the optical disk, the address information of the groove G1 is reproduced by detecting the quantity of reflected light which varies when the light beam spot BG1 scans the first pit string P1 in the first address region. The light beam spot BG1 then passes over the second address region. In a case when a light beam spot BG2 scans the groove G2 relatively, the address information of the groove G2 is reproduced by detecting the quantity of reflected light which varies when the light beam spot BG2 first passes over the first address region and then scans the second pit string P2 in the second address region.

In contrast, in a case when a light beam spot BL1 scans the land L1 relatively, the address information of the land L1 is reproduced by detecting signals which leak from the first pit string P1 and which changes the quantity of reflected light when the light beam spot BL1 scans near the first pit string P1 in the first address region. In a case when a light beam spot BL2 scans the land L2 relatively, the address information of the land L2 reproduced by detecting signals which leak from the second pit string P2 and which changes the quantity of reflected light when the light beam spot BL2 scans near the second pit string P2 in the second address region. This way, an optical disk is made such that address information can be reproduced both in the land and in the groove.

Now reference is made to FIG. 21 which illustrates a structure of addresses disclosed in Japanese Laid-Open Patent Application No. 9-17033/1997 (Tokukaihei 9-17033 published on Jan. 17, 1997; hereinafter, "Laid-Open Patent Application 2"). Grooves (G1, G2) and lands (L1, L2) are provided to form spiral lines with a substantially identical width. A first pit string P1 representing first address information is provided following the groove G1 in a first address region. A second pit string P2 is provided following the groove G2 in a second address region that is displaced off the first address region along the length of the track. The width of the groove is widened partially in radial directions to form pits p1 and p2 in the first and second pit strings P1 and P2.

The address information is reproduced, similarly to Laid-Open Patent Application 1, through changes in the quantity of reflected light in the address regions in the land and in the groove. This way, an optical disk is made such that address information can be reproduced both in the land and in the groove.

Now reference is made to FIG. 22 which illustrates a structure of addresses disclosed in Laid-open Patent Application 2. Grooves (G1, G2) and lands (L1, L2) are provided to form spiral lines with a substantially identical width. A wobbling groove representing address information is provided following the groove G1 in a first address region. Another wobbling groove representing address information is provided following the groove G2 in a second address region displaced off the first address region along the length of the track.

The address information is reproduced and detected, similarly to Laid-Open Patent Application 1, by means of the wobbling grooves causing changes in the quantity of reflected light in the address regions in the land and in the groove. This way, an optical disk is made such that address information can be reproduced both in the land and in the groove. Alternatively, the address information is reproduced and detected by means of the wobbling grooves in the address regions caused changes in push-pull signals.

Laid-Open Patent Application 1, however, admits in the description that tracking is unstable. We now discuss this problem in the following.

FIG. 23 is an enlarged view of the first address region of FIG. 20. Symmetric push-pull signals are obtained from the light beam spot BG1 scanning the groove G1, and tracking is effected such that the first pit string P1 is always located in the center of the light beam spot BG1, because the first pit string P1 cuts through the center of the light beam spot BG1.

In contrast, since the pit string P1 is located to the left of the light beam spot BL1 (or closer to the circumference of the disk, for example) in the first address region in the figure, asymmetric push-pull signals are obtained from the light beam spot BL1 scanning the land L1 where there is a gap between pits p1 which are located next to each other along the length of the track. As a result, the light beam spot BL1 moves left as shown in the figure (closer to the pit string P1) while tracking, which renders the tracking unstable. In a worst scenario, the light beam spot BL1 jumps to a different track when moving in the address region. Therefore, in some devices for recording/reproducing such optical disks, a tracking control is temporarily suspended in the address region.

Laid-Open Patent Application 2 also admits in the description that tracking is unstable. FIG. 24 is an enlarged view of the first address region in FIG. 21. The formation of the first pit string P1 constituted by pits p1 that are wider than the groove in the first address region makes push-pull signals obtained from the light beam spot BG1 scanning the land L1 asymmetric as shown in the figure. As a result, the light beam spot BL1 moves right as shown in the figure (closer to the groove G21) while tracking, which renders the tracking unstable. In a worst scenario, the light beam spot BL1 jumps to a different track when moving in the address region. Therefore, in some devices for recording/ reproducing such optical disks, a tracking control is temporarily suspended in the address region.

As to the second structure of FIG. 22 disclosed in Laid-Open Patent Application 1, the address is given in the form of wobbling grooves. Push-pull signals become asymmetric for sure, but the wobbling of the groove makes it possible for the light beam spot to be located substantially at the center of the wobbling groove. This way, stable tracking is effected. There is however a setback to the structure. The wobbling groove is formed to continuously bend rightward and leftward; as a result, reproduced and detected signals slowly change reflecting the continuous wobbling. The reproduction signals, representing the address information, show poor quality.

The present invention is intended to solve these problems, and has objectives to offer magneto-optical and other optical disks where a stable tracking control is effected by means of restraint of crosstalk which may occur in the information pre-recorded in the form of pit strings and changes in the track width, and also relates to recording/reproducing devices intended for use with these disks.

SUMMARY OF THE INVENTION

An optical disk in accordance with the present invention utilizes both a groove and a land as a recording track and includes:
  a first pit string of pits lined along a length of a track, provided in a first recording track which is either a groove or a land; and
  a second pit string of pits lined along a length of a track, provided in a first recording track which is adjacent, in a radial direction of the disk, to the first recording track in which the first pit string is provided,
  wherein:
    the second pit string is displaced off the first pit string along a length of a track so as not to overlap the first pit string in a radial direction of the disk; and
    an interval between two pits which are adjacent along a length of a track in the first and second pit strings is specified to be equal to, or less than, half a width of the two pits measured in a radial direction of the disk.

In the conventional technology disclosed in Laid-Open Patent Application 1, pits are located discretely so that addresses are stored by the intervals between pits and the lengths of pits. Some intervals are therefore greater than others, which causes asymmetric push-pull signals to be produced when a light beam spot moves over an address region in a recording track which is a land. This undesirably destabilizes tracking.

In contrast, in the optical disk in accordance with the present invention, the interval between two pits which are adjacent along the length of the track in the first and second pit strings is specified to be equal to, or less than, half the width of the two pits measured in a radial direction of the disk. Therefore, the tracking signal is hardly disturbed (or disturbed for a very short time) by the gaps in the pit strings. This arrangement effects more stable tracking compared with the preceding optical disk in which pits are located discretely. Further, the pit strings which are adjacent in a radial direction of the disk (i.e., the first pit string P1 and the second pit string P2) are provided displaced along a length of a track and do not overlap each other in a radial direction of the disk. Therefore, when the land or the groove is scanned, signals reproduced from the first pit string P1 and those from the second pit string P2 are clearly separated and can be read accurately.

An optical disk in accordance with the present invention utilizes both a groove and a land as a recording track and includes:
  a first width varying portion, having a track width which varies between a first width and a second width, provided in a first recording track which is either a groove or a land; and
  a second width varying portion, having a track width which varies between a first width and a second width, provided in a first recording track which is adjacent, in a radial direction of the disk, to the first recording track in which the first width varying portion is provided,
  wherein:
    the second width varying portion is displaced off the first width varying portion along a length of a track so as not to overlap the first width varying portion in a radial direction of the disk; and
    WG≈WL and W1<WG<W2, where WG is a width of the groove, WL is a width of the land, W1 is the first width, and W2 is the second width.

In Laid-Open Patent Application 2, the width in the address region is greater than the width of the groove. Therefore, push-pull signals are asymmetric in the land, destabilizing tracking.

In contrast, in the optical disk in accordance with the present invention, it is presumed that the width of the groove WG is substantially equal to the width of the land WL in the first width varying portion and the second width varying portion, both of which serve as an address region. Further, a first width portion is provided with a width smaller than the width of the groove WG and a second width portion is provided with a width greater than the width of the groove. This reduces asymmetry in the push-pull signals on the whole, effecting more stable tracking.

An optical disk in accordance with the present invention utilizes both a groove and a land as a recording track and includes:
  first pit strings and second pit strings of pits lined along a length of a track, provided sequentially in first recording tracks which are either grooves or lands,
  wherein:
    letting inner and outer ends of the disk be designated as first and second sides respectively, or vice versa, a first pit string forms a pair with another first pit string in a first recording track which is adjacent thereto on the first side with respect to a specific first pit string, so that the pair of first pit strings of an identical pit arrangement are provided within an identical angular range with respect to a center of the disk; and a second pit string forms a pair with another second pit string in a first recording track adjacent thereto on the second side with respect to the second pit string following the specific first pit string, so that the pair of second pit strings of an identical pit arrangement are provided within an identical angular range with respect to the center of the disk.

In Laid-Open Patent Application 1, pits are located discretely on either one of the sides of a light beam spot moving over an address region in a recording track which is a land, which causes asymmetric push-pull signals to be produced. This undesirably destabilizes tracking.

In contrast, in the optical disk in accordance with the present invention, as a light beam spot moves over an address region in a recording track flanked by first recording tracks, the pit strings to the right and left of the light beam spot share an identical arrangement either in the first address region (the first pit string P1) or in the second address region (the second pit string P2). This arrangement effects more stable tracking compared with the preceding optical disk in which pits are located discretely.

An optical disk in accordance with the present invention utilizes both a groove and a land as a recording track and includes:

first width varying portions each having a track width which varies between a first width and a second width and second width varying portions each having a track width which varies between a first width and a second width, the first and second width varying portions being provided sequentially in first recording tracks which are either grooves or lands, letting inner and outer ends of the disk be designated as first and second sides respectively, or vice versa, a first width varying portion forms a pair with another first width varying portion in a first recording track which is adjacent thereto on the first side with respect to a specific first width varying portion, so that the pair of first width varying portions having an identical arrangement of the first and second widths are provided within an identical angular range with respect to a center of the disk;

a second width varying portion forms a pair with another second width varying portion in a first recording track adjacent thereto on the second side with respect to the second width varying portion following the specific first width varying portion, so that the pair of second width varying portions having an identical arrangement of the first and second widths are provided within an identical angular range with respect to the center of the disk; and WG≈WL and W1<WG<W2, where WG is a width of the groove, WL is a width of the land, W1 is the first width, and W2 is the second width.

In the optical disk in accordance with the present invention, a specific first width varying portion forms a pair with another first width varying portion which is adjacent thereto on the first side as described above, and the second width varying portion following a specific first width varying portion forms a pair with another second width varying portion which is adjacent thereto on the second side as described above. Therefore, as a light beam spot moves (scans) over a recording track flanked by first recording tracks, the light beam spot scans the first width varying portion and the second width varying portion on both sides of the recording track. This arrangement produces large and symmetric changes in the quantity of reflected light in a direction vertical to the length of a track, compared with an arrangement in which the first width varying portion and the second width varying portion are provided in every other groove. This further stabilizes tracking.

An optical disk in accordance with the present invention has a groove and a land, wherein:

address information is stored in a string of pits lined along a length of a track, some of the pits being located relatively close to a center of the disk and the others relatively close to a circumference of the disk so that the pit string extends along the length of a track, but wobbles in a radial direction of the disk.

In the optical disk disclosed in Laid-Open Patent Application 2, address information is provided in the form of grooves that wobble right and left in address regions following grooves (G1 and G2). The wobbling of a groove is detected as changes in the quantity of reflected light or changes in push-pull signals. Since the groove wobbles right and left continuously, the changes in the quantity of reflected light and in push-pull signals are continuous, which increases reproduction jitter in the reproduction of address information and thereby increases errors in the detection of addresses.

In contrast, in the optical disk in accordance with the present invention, address information is provided in the form of a pit string that wobbles right and left in the address region. The wobbling of the groove is reproduced and detected. Since the wobbling pits are not provided continuously, the wobbling changes sharply at the edges of pits, which reduces reproduction jitter in the reproduction of address information and thereby decreases errors in the detection of addresses.

An optical disk in accordance with the present invention utilizes both a groove and a land as a recording track and includes:

a wobbling pit string constituted by:

an inner string of pits lined along a length of a track in an inner side of a central line of a track in a radial direction of the disk; and an outer string of pits lined along a length of a track in an outer side of a central line of a track in a radial direction of the disk, the outer string being displaced off the inner string along a length of a track.

In the optical disk disclosed in Laid-Open Patent Application 2, information is provided in the form of grooves that wobble right and left following grooves (G1 and G2). The wobbling of a groove is detected as changes in the quantity of reflected light or changes in push-pull signals. Since the groove wobbles right and left continuously, the changes in the quantity of reflected light and in push-pull signals are continuous, which increases reproduction jitter in the reproduction of address information and thereby increases errors in the detection of addresses.

In contrast, in the optical disk in accordance with the present invention, information is provided in the form of a pit string that wobbles to the inner and outer sides of the central line of the track in a radial direction of the disk. The wobbling of the groove is reproduced and detected. Since the wobbling pits are not provided continuously, the wobbling changes sharply at the edges of pits, which reduces reproduction jitter in the reproduction of address information and thereby decreases errors in the detection of addresses.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIG. 1 to FIG. 6, the following will discuss embodiment 1 of the present invention.

Figure 1:
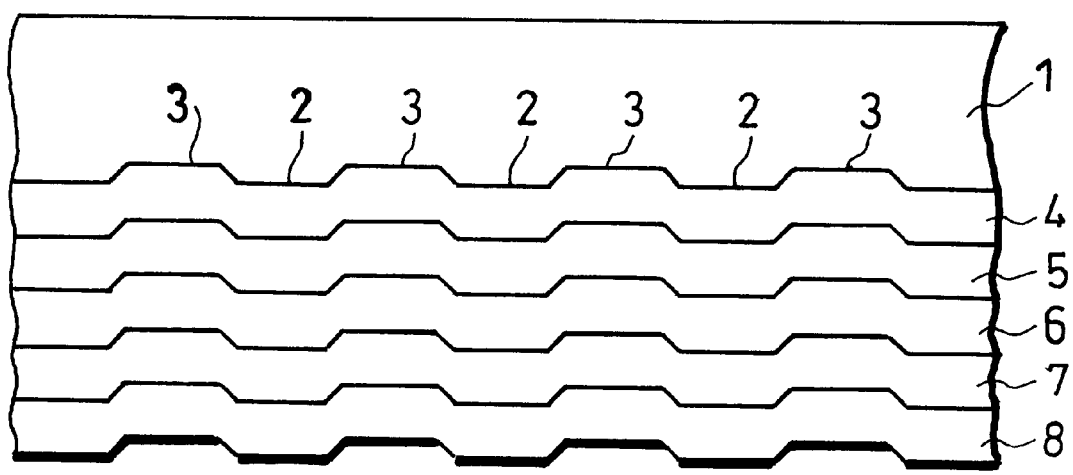
FIG. 1 is a vertical cross-sectional view showing the structure of an optical disk in accordance with an embodiment of the present invention.

FIG. 1 is a cross-sectional view showing a magneto-optical disk, an application of the present invention. Lands 2 and grooves 3 are provided to form relative convex and concave parts on the surface of the optical disk substrate 1. On the optical disk substrate 1 are provided at least an interference layer 4, a magnetic reproduction layer 5, an intermediate layer 6, a magnetic recording layer 7, and a protection layer 8, so as to form a super-resolution magneto-optical recording medium. The interference layer 4 is made of AlN or another transparent dielectric. The magnetic reproduction layer 5 is made of GdFeCo or another amorphous alloy of rare earth and transition metals. Magnetic information is copied to the magnetic reproduction layer 5 from the magnetic recording layer 7 before reproduction. The intermediate layer 6 serves to effect a control over the copying from the magnetic recording layer 7 to the magnetic reproduction layer 5. The magnetic recording layer 7 is made of TbFeCo or another amorphous alloy of rare earth and transition metals in which information is recorded in the form of the direction in magnetization. The protection layer 8 provides the magnetic layers the protection against oxidation and other kinds of degradation.

Figure 2:
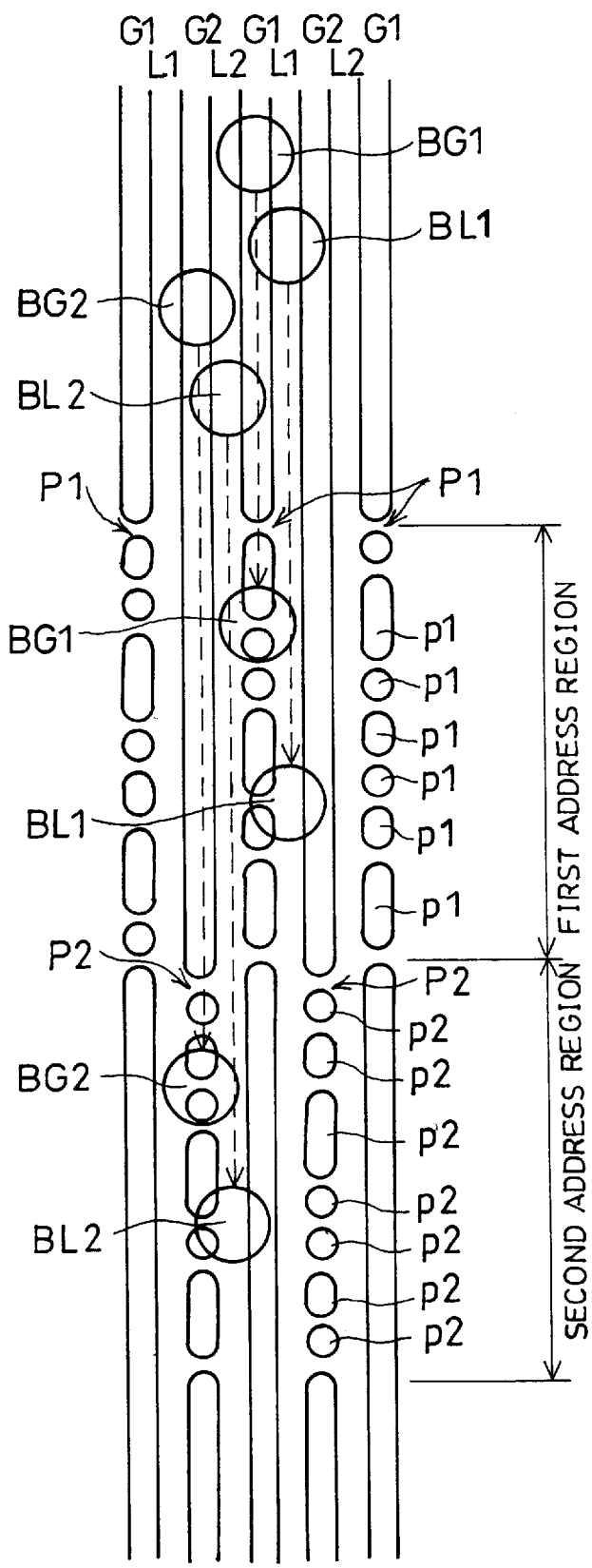
FIG. 2 is a plan view showing a main part of the structure of a recording track of an optical disk in accordance with embodiment 1 of the present invention.

FIG. 2 is a plan view showing address regions on the optical disk substrate 1 in the optical disk in accordance with embodiment 1. The optical disk in accordance with embodiment 1 has grooves G1 and G2, as well as lands L1 and L2, all being formed with substantially identical widths and serving as recording tracks. Each address region from which the information on the optical disk's position is derived is divided into a first address region and a second address region which are displaced along the length of the track. The first and second address regions are located in the individual tracks at the same angular position with respect to the disk center. Further, similarly to Laid-Open Patent Application 1 illustrated in FIG. 20, first and second pit strings P1 and P2 are provided following the grooves (first recording tracks) G1 and G2 respectively, forming first and second address regions.

In the optical disk in accordance with the present invention, the first pit string P1 is constituted by pits p1 each spaced from immediately adjacent ones in the same pit string by an invariable, predetermined length so that it can record address information as the lengths of the pits p1. The same description applies to the second pit string P2 and its pits p2. The length, DP (see FIG. 3), of the gap between immediately adjacent pits is specified not to exceed half the width, WP, of the pits p1 and p2 constituting the pit strings P1 and P2 respectively. The width WP here is measured in a radial direction of the disk. This relationship is expressed by the following equation:

$$DP \leq WP/2$$

The address information of the groove G1 is reproduced by detecting the quantity of reflected light which varies when a light beam spot BG1 passes over the gaps in the first pit string P1 in the first address region. The address information of the land L1 is reproduced by detecting signals which leak from the first pit string P1 when a light beam spot BL1 passes over the first address region. As the light beam spot BL1 moves down along the land L1 and passes the first address region, the first pit string P1 comes in the light beam spot BL1, and its gaps cause changes in the quantity of reflected light. The leak signals are derived from these changes. The address information of the groove G2 is reproduced by detecting the quantity of reflected light which varies when a light beam spot BG2 passes over the gaps in the second pit string P2 in the second address region. The address information of the land L2 is reproduced by detecting signals which leak from the second pit string P2 when a light beam spot BL2 passes over the second address region.

Figure 20:
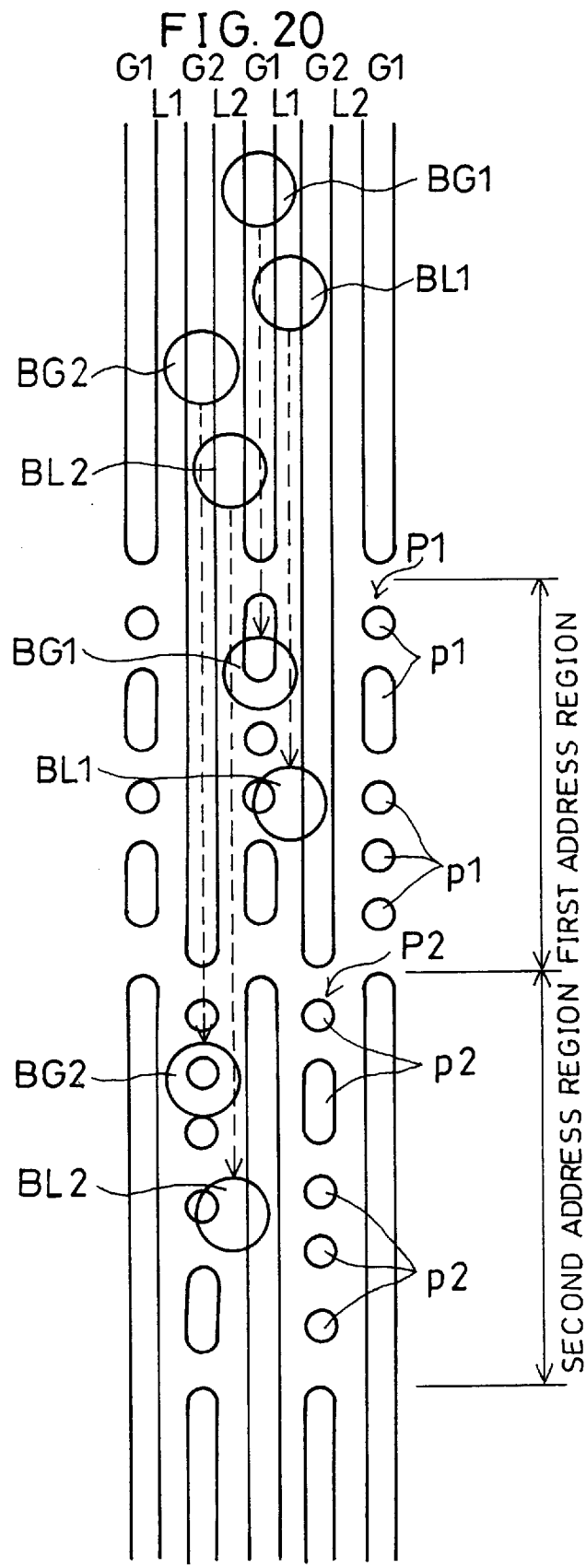
FIG. 20 is a plan view illustrating a conventional optical disk.
Figure 23:
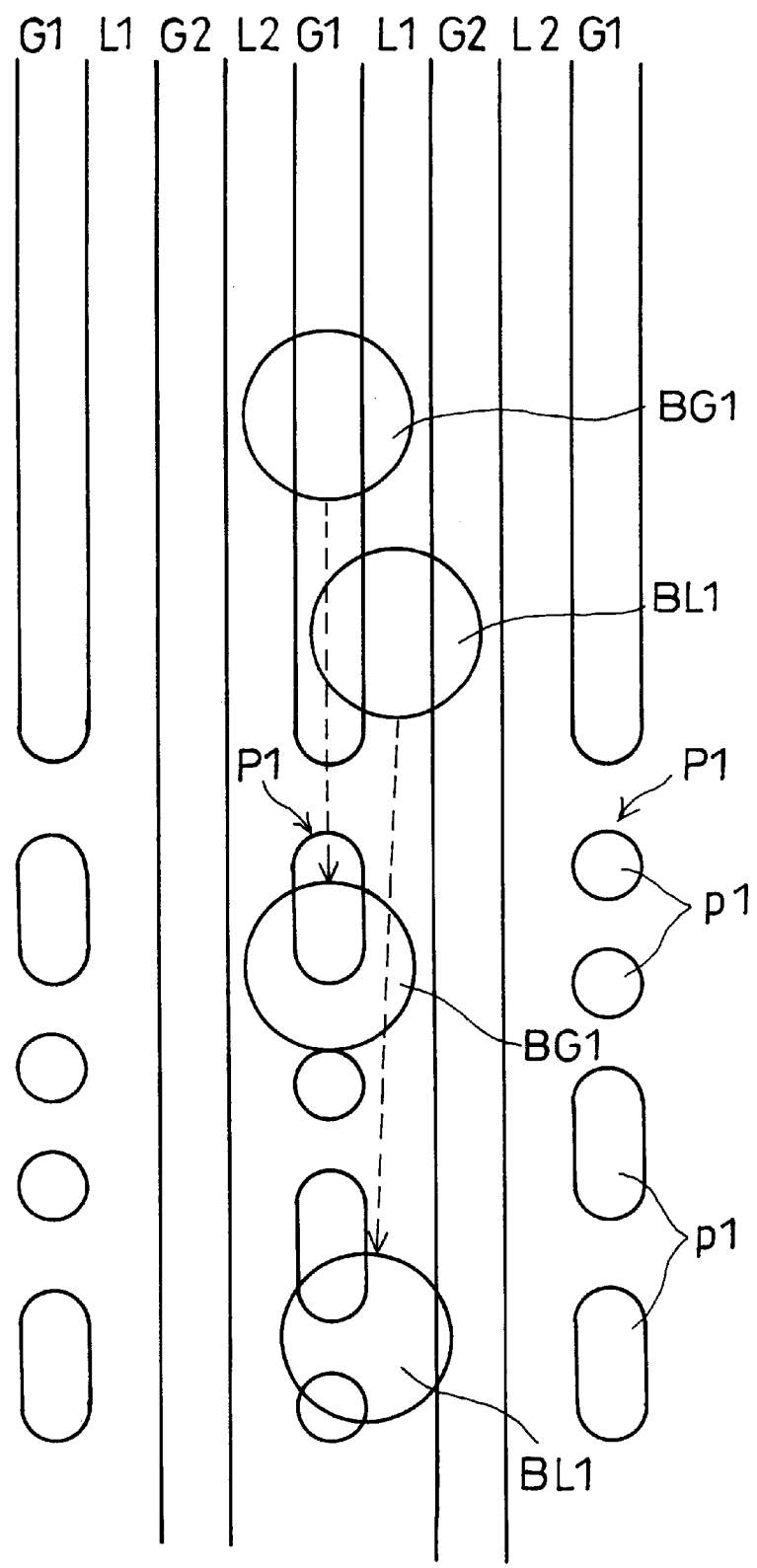
FIG. 23 is a plan view illustrating another conventional optical disk.

Referring back to Laid-Open Patent Application 1 shown in FIG. 20 and FIG. 23, the address is recorded as the intervals between pits and the length of the pits, which requires pits to be located discretely. Some intervals between pits are therefore inevitably large. As the light beam spot moves down along an address region following the land, asymmetric push-pull signals are produced due to the large intervals and make it impossible to effect stable tracking.

In contrast, in the optical disk of FIGS. 1 and 2 in accordance with the present embodiment, the length of the gaps in the pit string is specified not to exceed half the width of the pits constituting the pit string measured in a radial direction of the disk. The tracking signal is hardly disturbed by the gaps (disturbance disappears very quickly) and enables a stable tracking when compared with optical disks with discretely located pits. Further, pit strings that are adjacent in a radial direction of the disk (i.e., the first pit string P1 and the second pit string P2) are provided not side by side, but relatively displaced. No two signals are reproduced simultaneously from the first and second pit strings P1 and P2 during the scanning of the land, so signals from each pit string are accurately reproduced.

Figure 3:
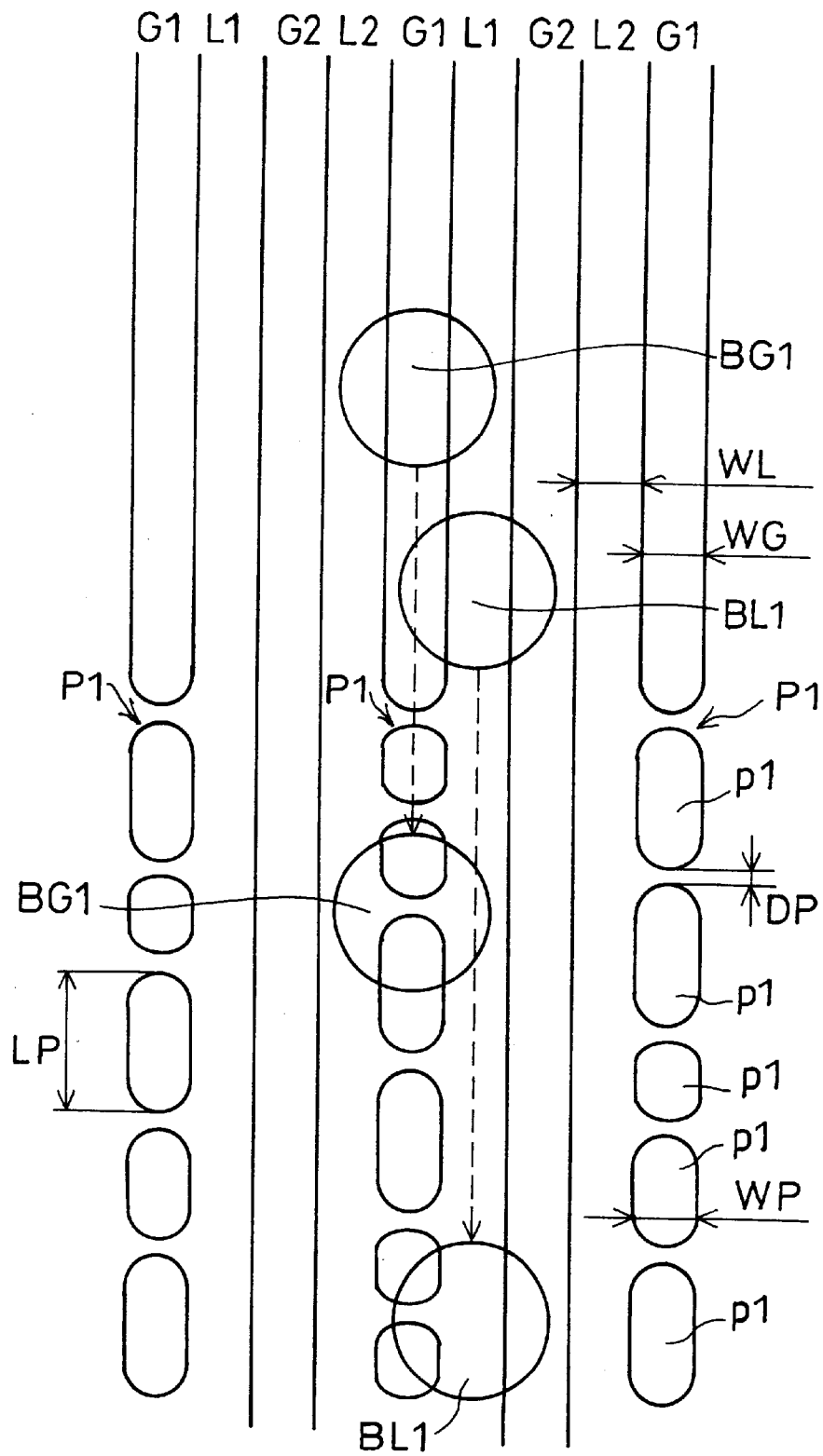
FIG. 3 is an enlarged plan view showing a main part of the optical disk of FIG. 2.

FIG. 3 is an enlarged view of the first address region in the optical disk in accordance with the present invention shown in FIG. 2. The address information of the groove G1 is reproduced when the light beam spot BG1 passes over the first pit string P1 in the first address region. Therefore, no asymmetric push-pull signals are produced, and stable tracking is effected. In contrast, since the pit string P1 is located to the left of the light beam spot BL1 in the figure in the first address region, the push-pull signals become asymmetric when the light beam spot BL1 scanning the land L1 passes besides the gaps in the pit string P1. However, the length of the gaps in the pit string is specified not to exceed half the width of the pits measured in a radial direction of the disk. Leak signals from the first pit string P1 therefore become detectable without losing stability in tracking.

Figure 4:
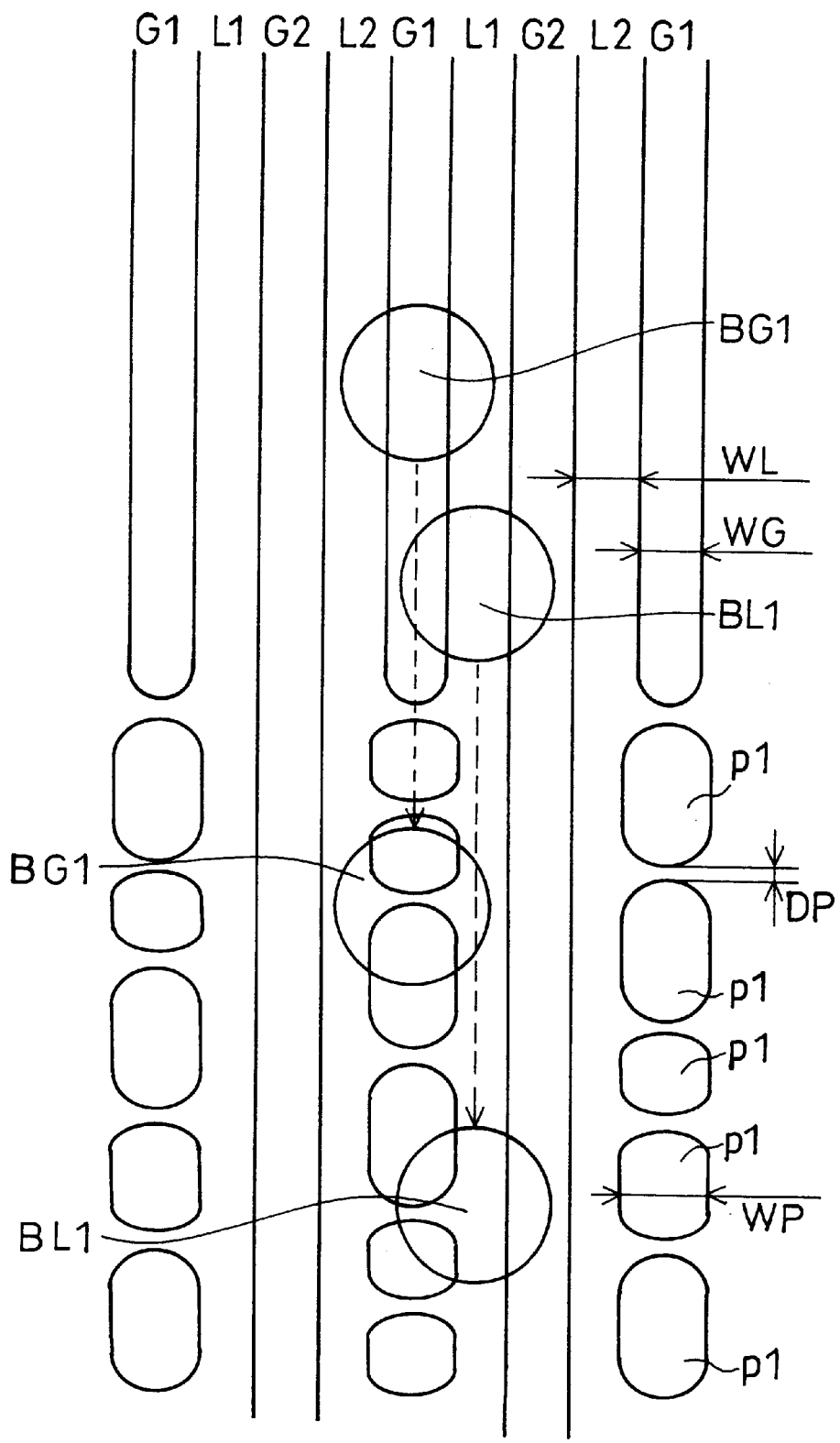
FIG. 4 is an enlarged plan view showing a modified example of the optical disk of FIG. 2.

Now, reference is made to FIG. 4 which shows a modified example of the optical disk of FIG. 3. The modification is made where the width, WP, of the first pit string is made greater than the substantially identical widths, WL and WG, of the lands L1 and L2 and the grooves G1 and G2 respectively.

In FIG. 3, to reproduce the address information of the groove G1, the first pit string P1 is scanned by the light beam spot BG1, and the gaps in the pit string P1 moves passing through the center of the light beam spot BG1 and thereby causes large changes in the quantity of reflected light. However, to reproduce the address information of the land L1, the first pit string P1 and the center of the adjacent groove G2 are scanned by the light beam spot BL1, and the gaps in the pit string P1 moves passing through the far left end of the light beam spot BL1 and thereby causes only small changes in the quantity of reflected light.

Accordingly, in FIG. 4, the width WP of the first pit string P1 is expanded exceeding the widths, WL and WG, of the land and the groove. This way, when the light beam spot BL1 moves down along the center of the groove G2, the gaps in the first pit string P1 occupy a greater area in the light beam spot BL1, and the address information of the land L1 can be reproduced with larger changes in the quantity of reflected light. Note that since the pit strings P1 and P2 are widened, there is a risk of the light beam spot scanning somewhat off the centers of the lands L1 and L2. However, the pit strings P1 and P2 have gaps, and therefore the displacement of the light beam spot is restrained when compared to conventional examples shown in FIG. 21 and FIG. 24. Preferably, in FIG. 4, the pit width WP of the first pit string P1 is specified so that the mean width of the entire first pit string P1 including the gaps is substantially equal to the width WG of the groove. The same specification applies to the second pit string P2.

Figure 25:
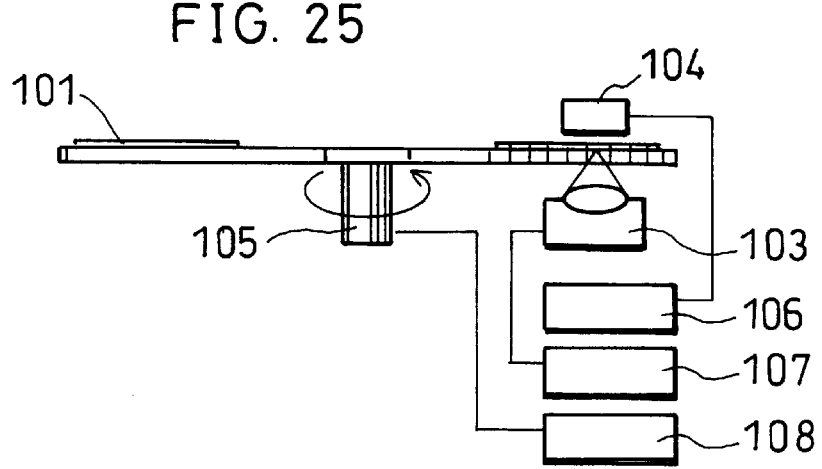
FIG. 25 is a block diagram schematically showing the arrangement of a device which records/reproduces data on the optical disk of FIG. 1.

Now, referring to FIGS. 25 and 26, the following will discuss a recording/reproducing device for recording/reproducing foregoing magneto-optical disks.

To reproduce data in FIG. 25, a spindle motor 105 is controlled by a rotation control section 108 and drives the magneto-optical disk (optical disk) 101 so that it rotates. Then, an optical pickup 103 emits a light beam, aiming at a part of the magneto-optical disk 101 from which data is to be reproduced. To record data, in response to a command from a magnetic field control section 106, a magnetic field application device 104 applies a magnetic field. The optical pickup 103 is adapted to project a light beam to a part of the disk 101 where data is to be reproduced, with assistance by the optical pickup control section (incorporating the tracking control section) 107 which effects a focusing and tracking control. If the magneto-optical disk 101 in accordance with the present embodiment is to be used, the optical pickup control section 107 can control the tracking along the first and second pit strings. This tracking control enables satisfactory recording/reproducing operations to be carried out even in the presence of the first and second pit strings.

Figure 26A:
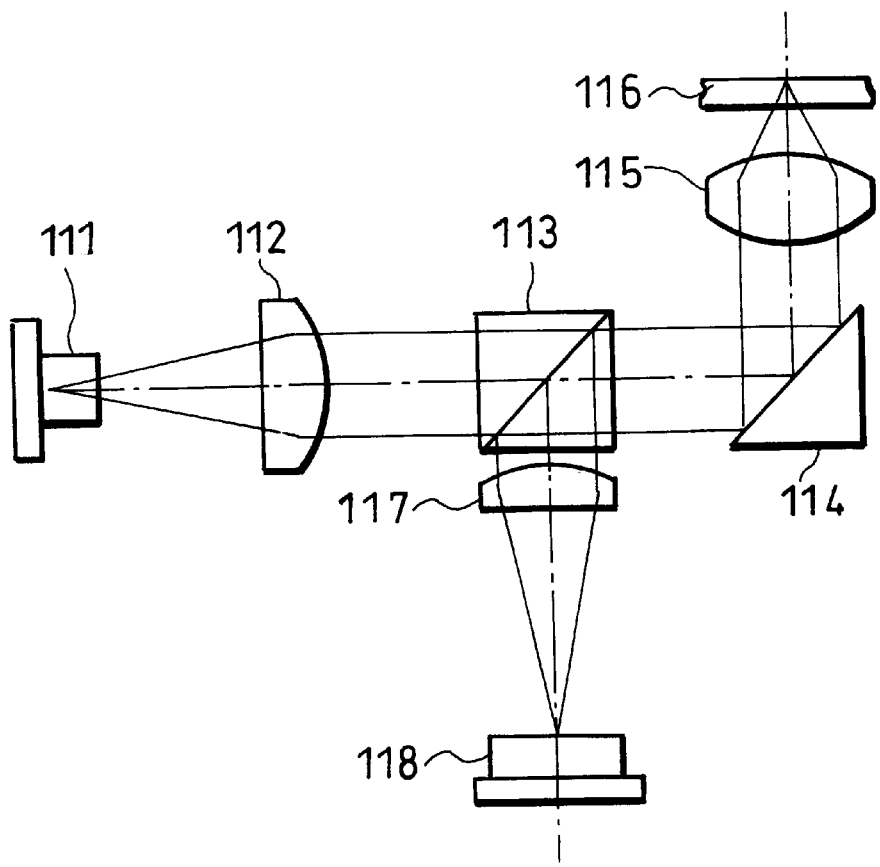
FIG. 26(a) and FIG. 26(b) show an arrangement of an optical pickup which detects a tracking error signal by means of a push-pull method, FIG. 26(a) illustrating the arrangement of the optical system, FIG. 26(b) illustrating the arrangement of the optical detecting section.
Figure 26B:
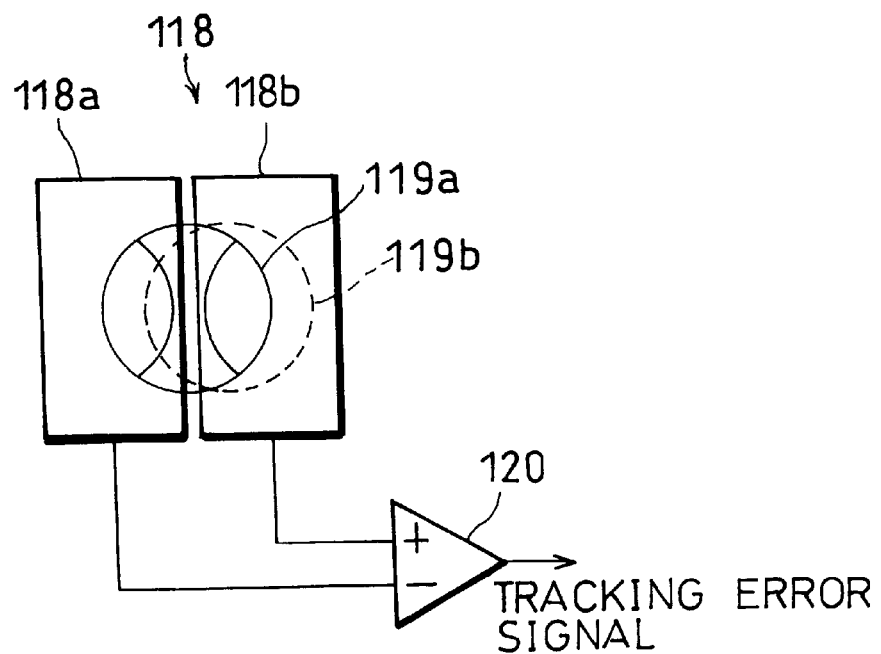

FIGS. 26(a) and 26(b) show the arrangement of the optical pickup 103 for detecting a tracking error signal according to a push-pull technique. FIG. 26(a) illustrates the arrangement of its optical system, and FIG. 26(b) illustrates the arrangement of its optical detecting section. As shown in FIG. 26(a), a collimator lens 112 for collimating light, a beam splitter 113, and a mirror 114 are arranged along the optical axis of a semiconductor laser 111 as a light source. Further, the mirror 114 for turning the laser optical axis by 90° and an objective lens 115 for converging light reflected at the mirror 114 are arranged perpendicular to the recording surface of a disk 101. A converging lens 117 and a light detector 118 are further disposed facing a side of the beam splitter 113, so that the light detector 118 converges the reflected light from the disk.

In this structure, light emitted from the semiconductor laser 111 is collimated by the collimator lens 112, guided through the beam splitter 113, reflected by the mirror 114, and focused by the objective lens 115 on the optical disk 101 to form a convergence spot on the track. The light reflected by the track on the optical disk 101 returns to the semiconductor laser 111 along the same optical path, partially reflected by the beam splitter 113 and converged by the converging lens 117 on the light detector 118.

The light detector 118, as shown in FIG. 26(b), is divided into two portions: light receiving surfaces 118a and 118b. The light which is reflected by the optical disk 116 and converged on the two surfaces forms a diffraction pattern 119a due to interference of light of 0 order with diffracted light of +1 and −1 orders due to the disk track. The output terminals of the light receiving surfaces 118a and 118b are connected to the input terminal of a differential operator 120.

According to the push-pull technique, a tracking error signal is produced based on a change in light intensity caused by a displaced diffraction pattern 119b which in turn results from the deviation of the convergence spot projected by the objective lens 115 off the track on the optical disk 101. A tracking error signal is obtainable via the differential operator 120 calculating the difference between the light intensities at the light receiving surfaces 118a and 118b.

Figure 5:
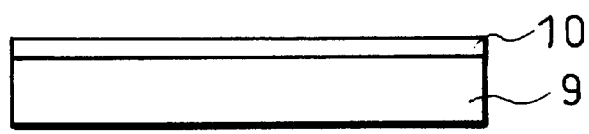
FIG. 5(a) to FIG. 5(e) are drawings illustrating a manufacturing process of the optical disk of FIG. 1.
Figure 5:
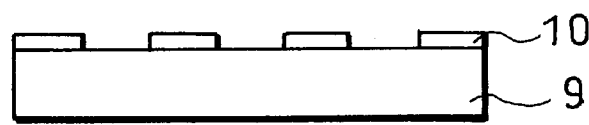
Figure 5:
Figure 5:
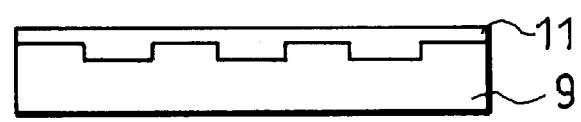
Figure 5:

The following will discuss a manufacturing process of an optical disk substrate for use in the present embodiment detailed above, in reference to FIG. 5.

First, a photoresist is applied on a quartz glass substrate 9 to form a photoresist film 10 (see FIG. 5(a)).

Figure 6:
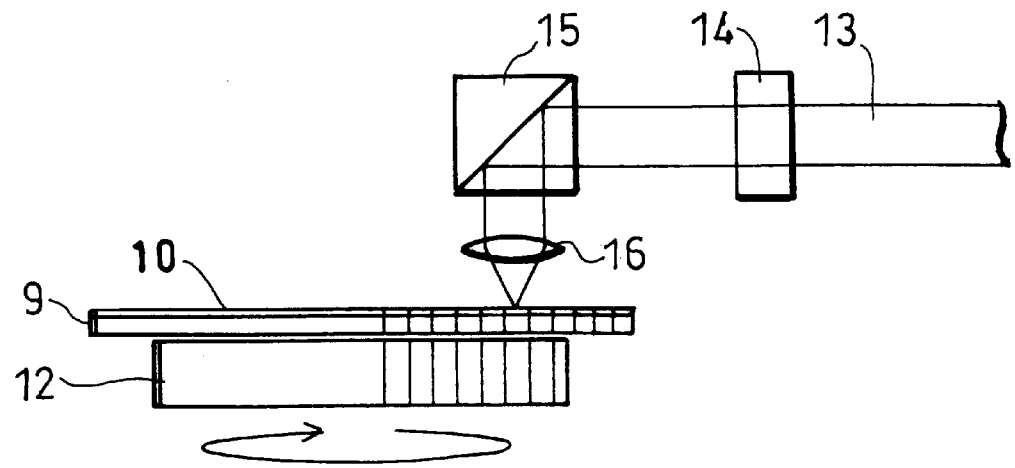
FIG. 6 is an explanatory drawing illustrating an arrangement of a laser cutting device used for exposure of the photoresist film of FIG. 5(b).

The photoresist film 10 is exposed by a laser cutting device shown in FIG. 6 and then developed to form a pattern of convexities and concavities out of the photoresist film 10 (see FIG. 5(b)). To implement the exposure step in the laser cutting, the quartz glass substrate 9 with the photoresist film 10 formed on it is placed on a rotatable turn table 12. The photoresist film 10 is exposed to a laser beam 13 capable of the exposure, such as HeCd laser, which is guided through an optical modulator 14, reflected by a mirror 15, and then converged by the objective lens 16 on the photoresist film 10. The lands L1 and L2 and the grooves G1 and G2, serving as recording tracks, are formed by continuous emission of the laser beam 13, i.e., continuous exposure. To form the first and second pit strings P1 and P2 storing addresses, the photoresist film 10 is exposed to pulses which are modulated by the optical modulator 14 based on the laser beam 13.

The photoresist film 10 is used as a mask to dry-etching the quartz glass substrate 9 and thereby form an etched pattern including convexities and concavities on the quartz glass substrate 9. The photoresist film 10 is then removed to complete preparation of a master disk 9 (see FIG. 5(c)).

Next, the master disk 9 is electrotyped using Ni or another metal to form a stamper 11 (see FIG. 5(d)).

Finally, the stamper 11 is removed from the master disk 9 (see FIG. 5(e)).

The stamper 11 thus fabricated is set in an injection molder, where polycarbonate or another resin is molded by injection so that an optical disk substrate results.

The difference in levels of the convexities and concavities formed on the optical disk substrate varies depending whether address information is reproduced based on push-pull signals or reflected light intensity signals.

Letting n represent the refractive index of the substrate and $\lambda$ represent the wavelength of the semiconductor laser used for recording and reproduction, the push-pull signal has a peak value where the difference in levels equals $\lambda/(8n)$ and takes a 0 value when the difference in levels equals $\lambda/(4n)$. To effect stable tracking, a push-pull signal which enables tracking must be obtainable. Accordingly, the difference in levels preferably ranges from $\lambda/(16n)$ to $(3\lambda)/(16n)$. To obtain address information based on a push-pull signal, a large push-pull signal is necessary. Accordingly, the difference in levels preferably ranges from $\lambda/(16n)$ to $(3\lambda)/(16n)$. Meanwhile, to obtain address information based on a signal indicative of the quantity of reflected light, the difference in levels ranging from $\lambda/(16n)$ to $(3\lambda)/(16n)$ sufficiently enables reproduction of address information. However, since the change in the quantity of reflected light has a peak value where the difference in levels equals $\lambda/(4n)$, the difference in levels is preferably in a range from $(2\lambda)/(16n)$ to $(3\lambda)/(16n)$ to obtain a tracking-enabling push-pull signal and a large change in the quantity of reflected light.

An optical disk was fabricated as shown in FIG. 2 in accordance with embodiment 1 described above. The groove, land, and address pit had a common width (WG, WL, WP) of 0.3 µm. The address pit had a length (LP) of 0.6 µm. The difference in levels was 40 nm. In these conditions, tracking operations were performed, each lasting 60 seconds, with various lengths, DP, of the gaps between address pits. In the operations, the semiconductor laser used had a wavelength of 410 nm, and the optical pickup 103 included an objective lens with a numerical aperture of 0.6. Results show that no error occurred in the tracking of a land when the length, DP, of the gap was equal to or less than 0.15 µm. In contrast, it is shown that errors did occur in the tracking of a land when the length, DP, of the gaps was more than 0.15 µm. For example, when the length, DP, of the gaps was set to 0.19 µm, an error occurred twenty-five seconds after the tracking was started. To sum it up, in the present embodiment, the length, DP, of the gaps needs to be set not to exceed half the width, WP, of the pits p1 and p2 constituting the pit strings P1 and P2 measured in a radial direction of the disk.

Another optical disk was fabricated as shown in FIG. 4 with the same specifications, except for the length, DP, of the gaps which was set to 0.11 µm and the width, WP, the pits p1 and p2 (address pits) which was set to less than 0.4 µm, and then compared with an optical disk with the length, DP, of the gaps set to 0.11 µm and the width, WP, of the pits p1 and p2 set to 0.3 µm. When the light beam spot BL1 passed over the first and second pit strings P1 and P2, the former optical disk showed a 30% larger change in the quantity of reflected light than the latter one, which is due to the expansion of the width, WP, of the pits p1 and p2 to 0.4 µm.

The present embodiment, so far, has been limited only to discussion of magneto-optical disks. However, the arrangement as introduced in the present invention is applicable to optical disks of phase change and other types as well. For a phase change optical disk, the magnetic field application device 104 and the magnetic field control section 106 are no longer necessary and can be omitted from FIG. 25.

Embodiment 2

Figure 7:
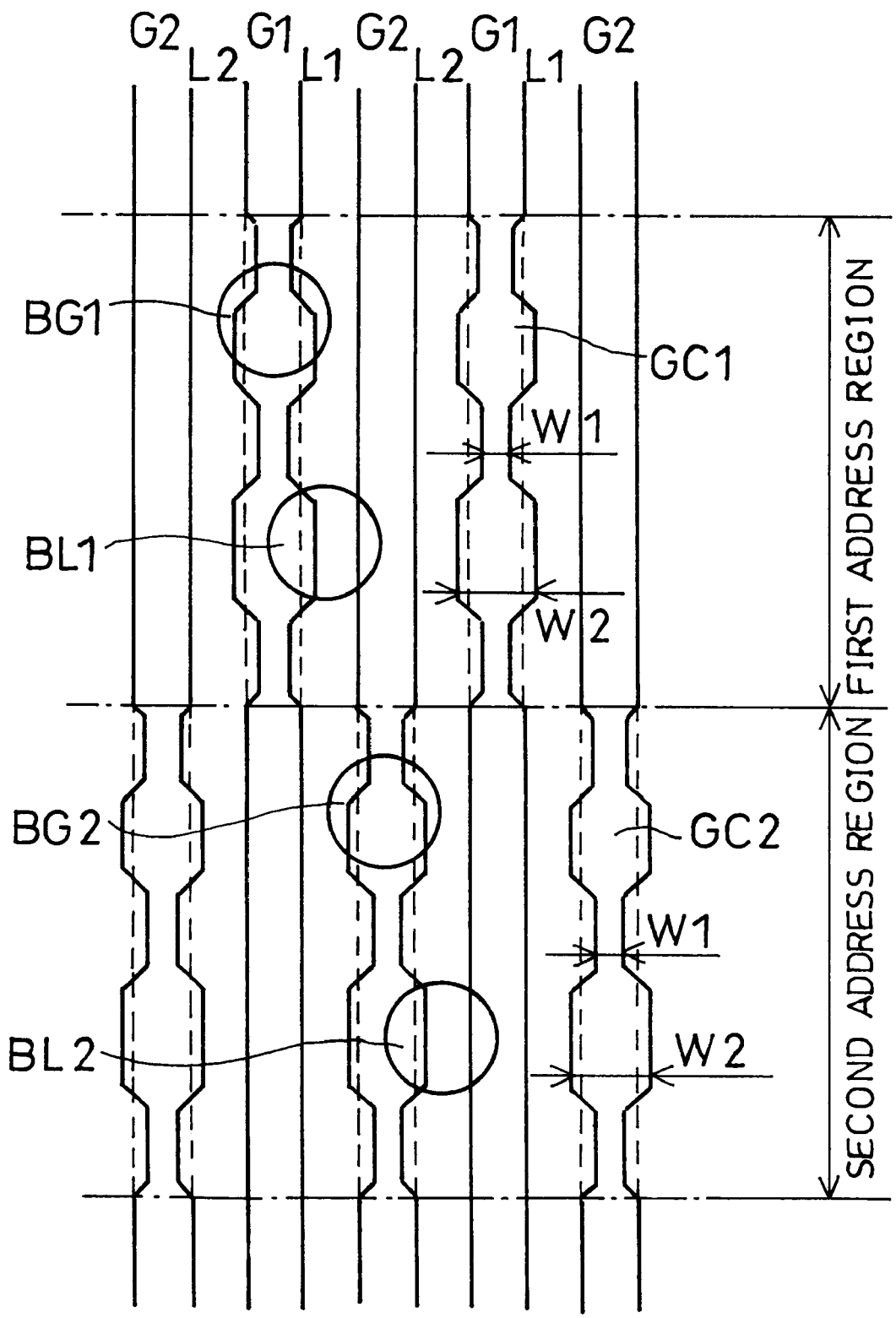
FIG. 7 is a plan view showing the structure of a recording track in the optical disk in accordance with embodiment 2 of the present invention.
Figure 8:
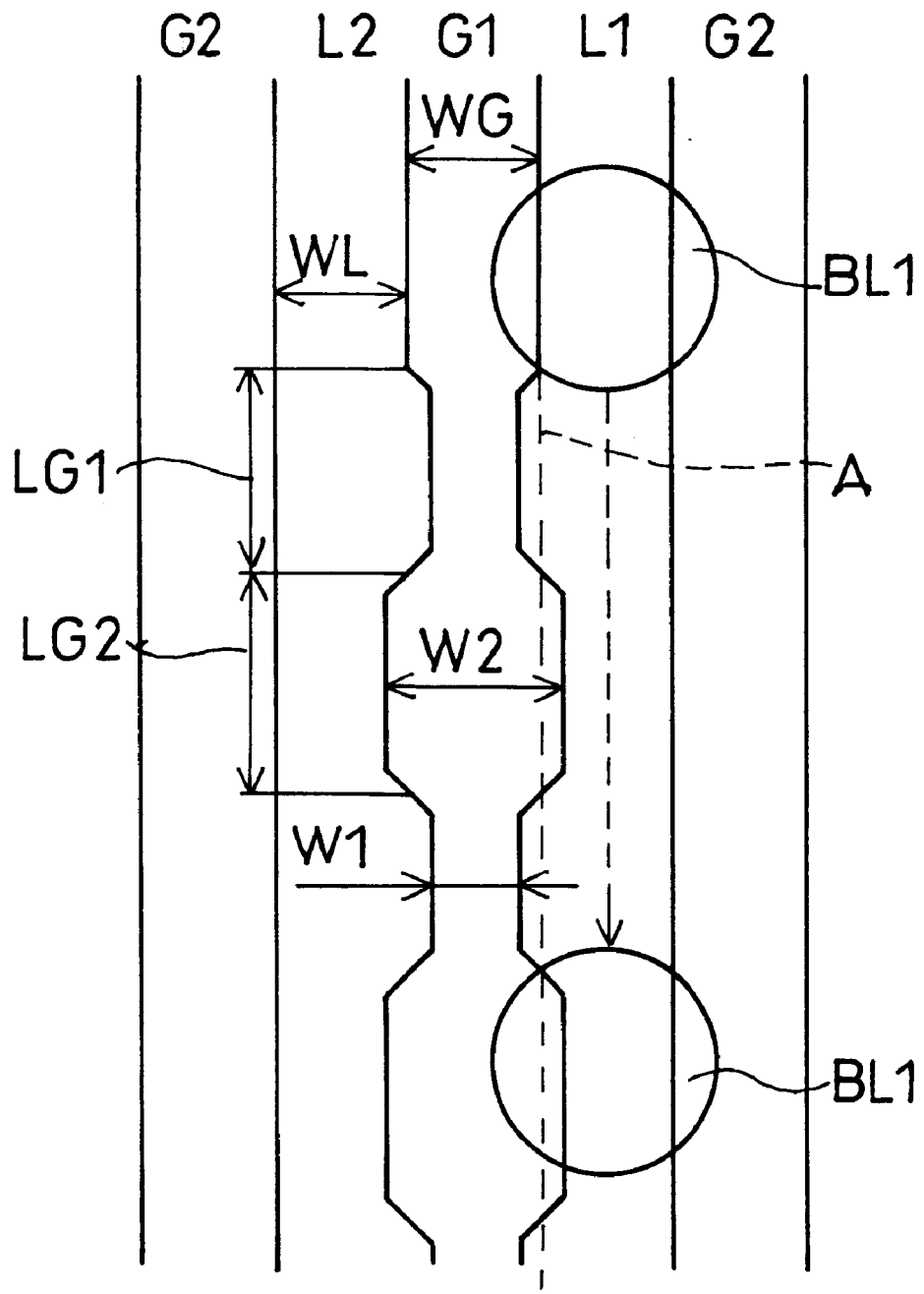
FIG. 8 is an enlarged plan view showing a main Apart of the optical disk of FIG. 7.

The following will discuss embodiment 2 of the present invention in reference to FIGS. 7 and 8.

FIG. 7 is a plan view showing address regions on an optical disk substrate in accordance with embodiment 2. Such an optical disk in accordance with embodiment 2 has grooves G1 and G2 (first recording track) and lands L1 and L2 of a substantially identical width. Both the grooves G1 and G2 and the lands L1 and L2 are used as recording tracks. Address regions storing positional information of the optical disk include a first address region and a second address region which are displaced along the length of the track. The first and second address regions are located in the individual tracks at the same angular position with respect to the disk center.

In the first address region, there is provided, following the groove G1, a first width varying portion GC1 which varies in width in a range from a first groove width W1 to a second groove width W2. In the second address region, there is provided, following the groove G2, a second width varying portion GC2 which varies in width in a range from the first groove width W1 to the second groove width W2. The second width varying portion GC2 is located in a groove which is adjacent in a radial direction of the disk to the groove in which the first width varying portion GC1 is located. The individual parts having the first and second groove widths W1 and W2 are arranged in accordance with a signal obtained by frequency or phase modulation of the address information. Further, those parts having the first groove width W1 account for substantially the same length as those parts having the second groove width W2 on the entire disk. As shown in FIG. 8, letting WG represent the width of the grooves, WL the width of the lands, W1 the first groove width, and W2 the second groove width W2, the optical disk substrate is fabricated such that WG≈WL and W1<WG<W2.

The address information of the groove G1 is reproduced by detecting the quantity of reflected light which varies when a light beam spot BG1 passes over the first address region where the groove G1 changes its width. The address information of the land L1 is reproduced by detecting the quantity of reflected light which varies when a light beam spot BL1 passes over the first address region where the land L1 changes its width. The address information of the groove G2 is reproduced by detecting the quantity of reflected light which varies when a light beam spot BG2 passes over the second address region where the groove G2 changes its width. The address information of the land L2 is reproduced by detecting the quantity of reflected light which varies when a light beam spot BL2 passes over the second address region where the land L2 changes its width.

Figure 21:
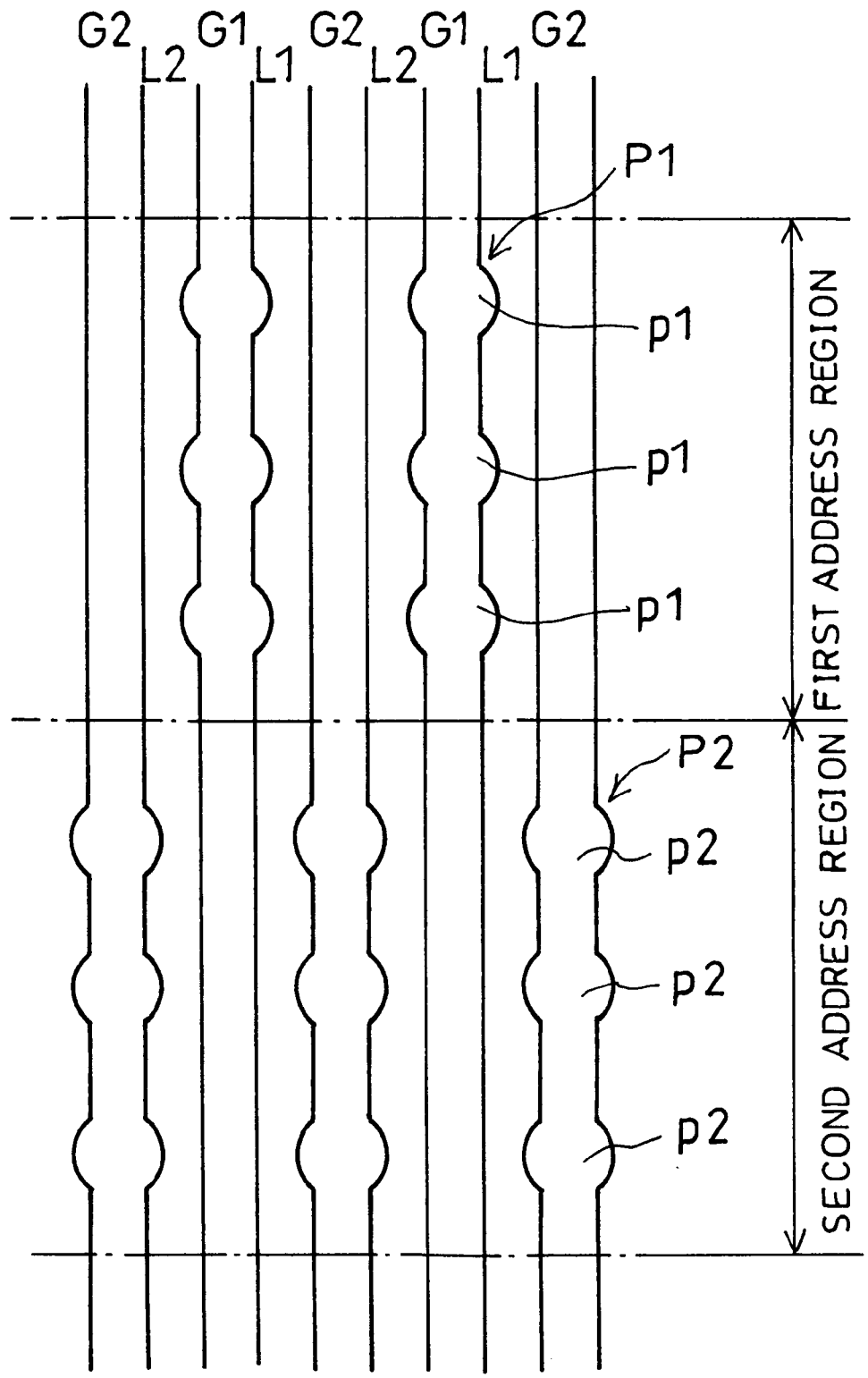
FIG. 21 is a plan view illustrating a conventional optical disk.
Figure 24:
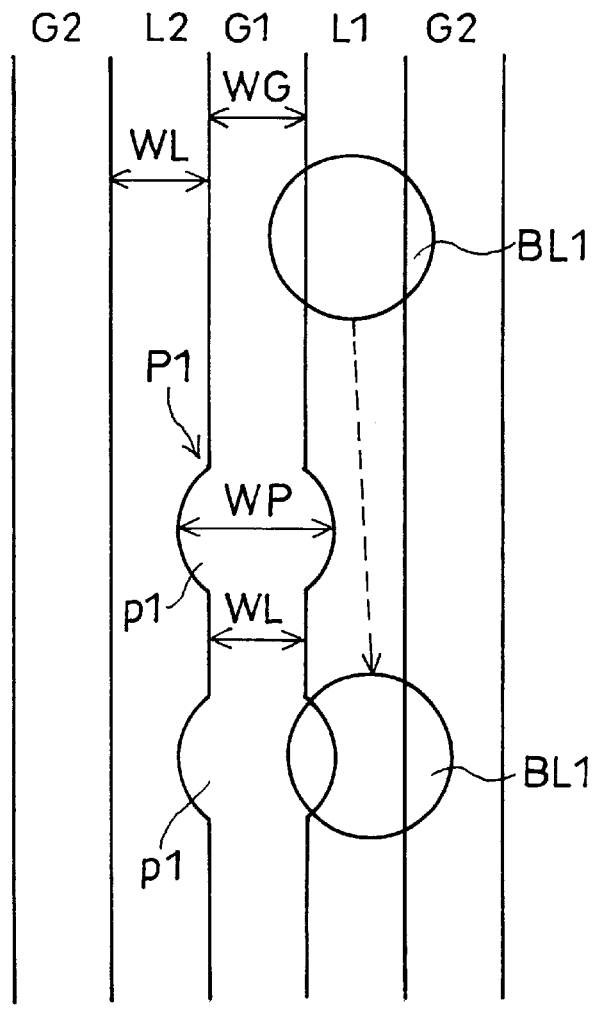
FIG. 24 is a plan view illustrating another conventional optical disk.

Referring back to Laid-Open Patent Application 2 shown in FIG. 21 and FIG. 24, only those parts that are wider than the groove are provided in address regions, and therefore, asymmetric push-pull signals are produced in the land and make it impossible to effect stable tracking. In contrast, in the optical disk in accordance with embodiment 2, the first groove width W1 which is smaller than the groove width WG and the second groove width W2 which is larger than the groove width WG appear alternately in the address region. Therefore, the push-pull signals exhibit improved symmetry when evaluated for the whole disk, which enables more stable tracking.

FIG. 8 is an enlarged view showing the first address region on the optical disk in accordance with the present invention shown in FIG. 7. The address information of the groove G1 is reproduced when the light beam spot BG1 passes over the first address region. Push-pull signals are symmetric, which effects stable tracking. Meanwhile, in the first address region, push-pull signals obtained from the scanning of the land L1 by the light beam spot BL1 become asymmetric temporarily. However, the first groove width which is smaller than the groove width and the second groove width which is larger than the groove width WG appear alternately in the first address region. Accordingly, the actual edge between the land L1 and the groove G1 in the address region changes symmetrically with respect to an extension line of the edge between the land L1 and the groove G1 in a data region. Consequently, in the address region, the light beam spot BL1 scans down along an extension line of the center line of the land L1 in the data region, which effects stable tracking.

As detailed so far, in embodiment 2, the edge between the land L1 and the groove G1 in the address region changes symmetrically with respect to the extension line A of the edge between the land L1 and the groove G1 in the data region. In other words, the groove width WG, the first groove width W1, and the second groove width W2 are provided so that (WG−W1)≈(W2−WG), which effects stable tracking.

A recording/reproducing device which records and reproduces data on the optical disk in accordance with embodiment 2 can be constructed similarly to the one shown in FIG. 25 in accordance with embodiment 1, and is capable of effecting a stable tracking control during the scanning of the first width varying portion GC1 and the second width varying portion GC2. If the present optical disk is of a phase change or other types such that no magnetic fields need to be applied, the magnetic field application device 104 and the magnetic field control section 106 are no longer necessary.

An optical disk substrate in accordance with embodiment 2 is fabricable similarly to that in accordance with embodiment 1. Such an optical disk substrate is fabricable by, when the address region is exposed in a laser cutting step, modulating the laser beam for exposure in terms of intensity using an optical modulator.

An optical disk was fabricated as shown in FIG. 7 in accordance with embodiment 2 described above. The grooves G1 and G2 and the lands L1 and L2 had a common width (WG, WL) of 0.3 µm. Those parts having the first groove width W1 and those parts having the second groove width W2 had a common length (LG1, LG2) of 0.6 µm. (Note that for an optical disk for real use, the length LG2 varies depending on the address information; however, we set LG2 0.6 µm as an experimental condition.) The difference in levels was 40 nm. In these conditions, tracking operations were performed, each lasting 60 seconds, In the operations, the semiconductor laser used had a wavelength of 410 nm, and the optical pickup included an objective lens with a numerical aperture of 0.6. Results show that when the first groove width W1 was 0.2 µm and the second groove width W2 was 0.4 µm, no error occurred in the tracking of the land L2. As comparative example 2, an optical disk was fabricated as shown in FIG. 21, with the first groove width W1 of 0.3 µm, that is, equal to the width of the grooves G1 and G2 and the lands L1 and L2 (WG, WL) and the second groove width W2 of 0.4 µm. We conducted the same experiments as above and verified that an error occurred in the land L2 thirty seconds after the tracking was started.

Embodiment 3

Figure 9:
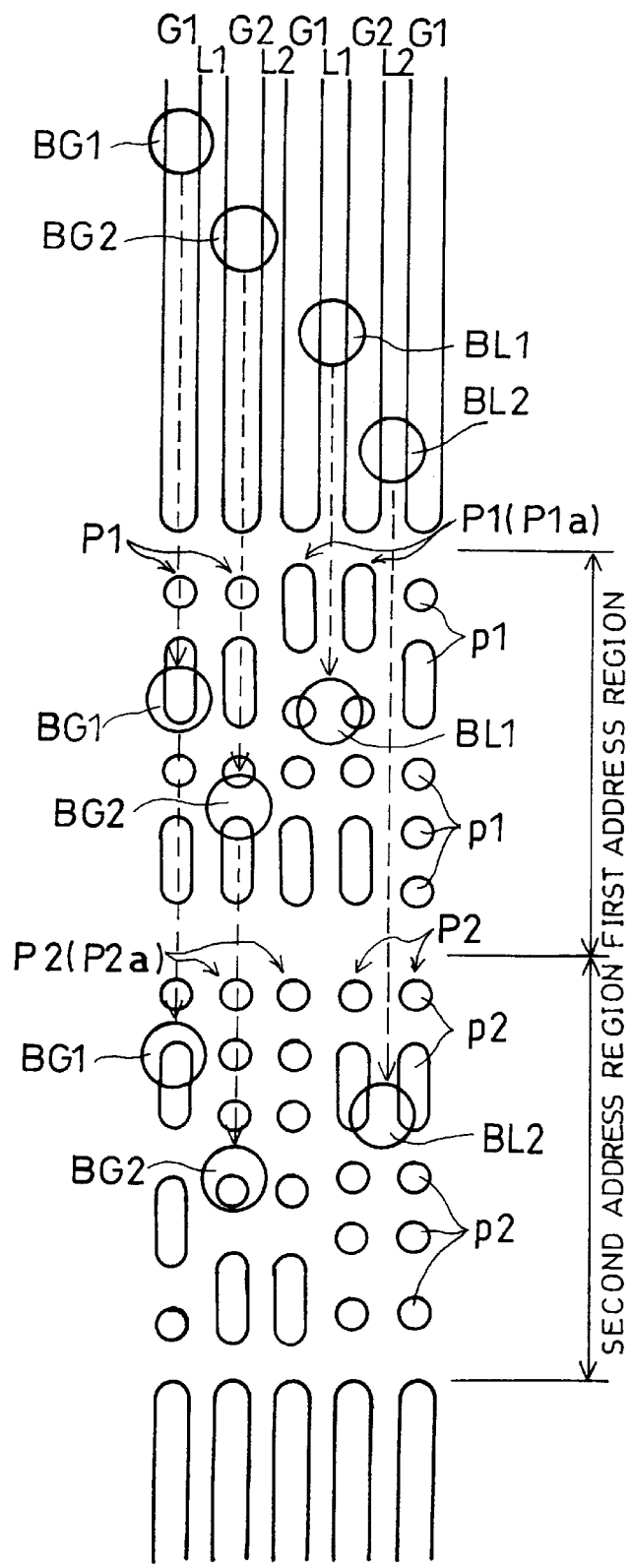
FIG. 9 is a plan view showing the structure of a recording track in the optical disk in accordance with embodiment 3 of the present invention.
Figure 10:
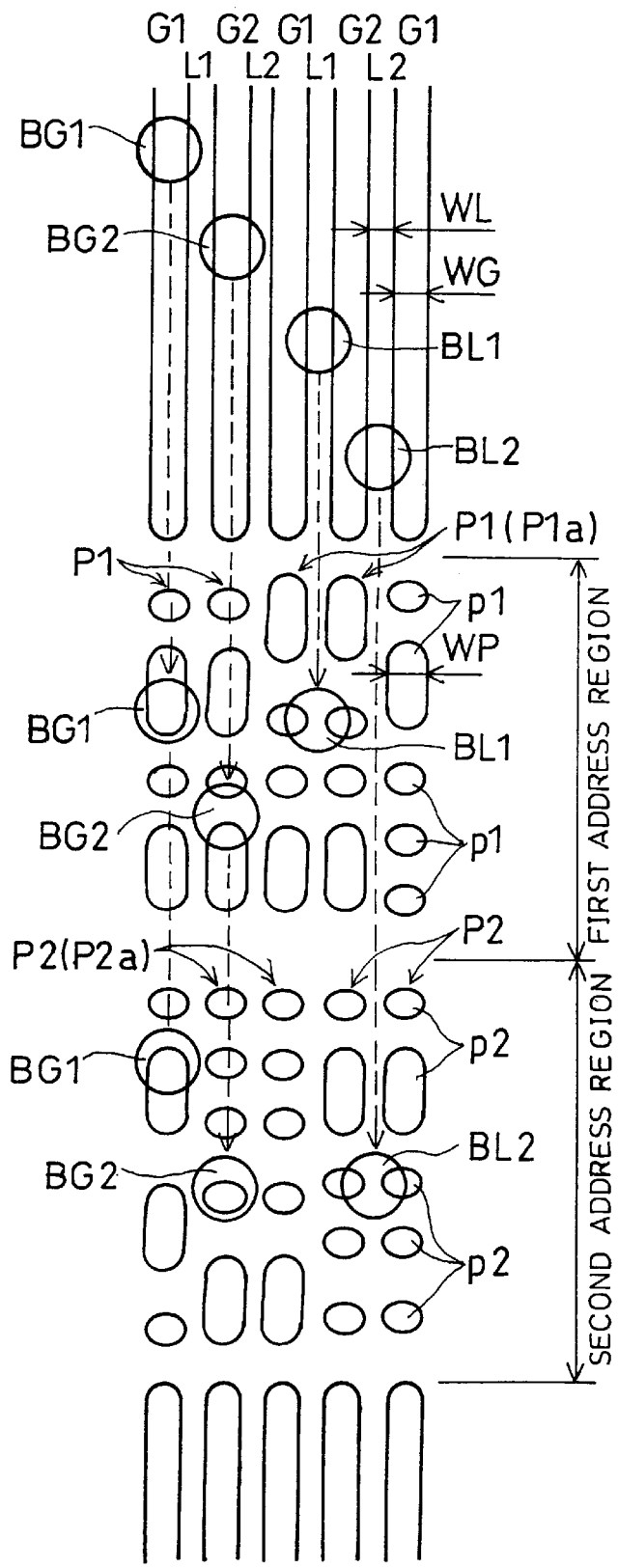
FIG. 10 is an enlarged plan view showing a main part of the optical disk of FIG. 9.

The following will discuss embodiment 3 of the present invention in reference to FIGS. 9 and 10.

FIG. 9 is a plan view showing address regions on an optical disk substrate in accordance with embodiment 3. Such an optical disk in accordance with embodiment 3 has grooves G1 and G2 (first recording tracks) and lands L1 and L2 of a substantially identical width. Both the grooves G1 and G2 and the lands L1 and L2 are used as recording tracks. Address regions storing positional information of the optical disk include a first address region and a second address region which are displaced along the length of the track. The first and second address regions are located in the individual tracks at the same angular position.

In the first and second address regions, there are provided, following the grooves G1 and G2, first and second pit strings P1 and P2 respectively. The first pit string P1 in the first address region following any one of the grooves has the same arrangement as the first pit string P1 following one of the two adjacent grooves, either one closer to the circumference or one closer to the center of the disk. The second pit string P2 in the second address region has the same arrangement as the second pit string P2 following the other adjacent groove.

Specifically, referring to FIG. 9, first pit strings P1 (P1a) of an identical pit arrangement are formed in the first address region following the groove G1 and in the first address region following the groove G2 immediately right to, or on the first side of, to the groove G1. Second pit strings P2 (P2a) of an identical pit arrangement are formed in the second address region following the groove G1 and in the second address region following the groove G2 immediately left to, or the second side of, the groove G1.

In other words, letting inner and outer ends of the disk be designated as first and second sides respectively, or vice versa, a first pit string forms a pair with another first pit string in the first recording track adjacent to it on the first side with respect to a specific first pit string, so that the pair of first pit strings of an identical pit arrangement are provided within an identical angular range with respect to the disk center.

A second pit string forms a pair with another second pit string in the first recording track adjacent to it on the second side with respect to the second pit string following the specific first pit string, so that the pair of second pit strings of an identical pit arrangement are provided within an identical angular range with respect to the disk center.

The address information of the groove G1 is reproduced by detecting the quantity of reflected light which varies when a light beam spot BG1 passes over the first pit string P1 in the first address region and the second pit string P2 in the second address region. The address information of the land L1 is reproduced by detecting signals which leak from the first pit string P1 forming a pair, flanking the land L1, with another first pit string P1 of an identical arrangement when a light beam spot BL1 passes over the first address region. As the light beam spot BL1 moves down along the land L1 and passes the first address region, the first pit string P1 comes in the light beam spot BL1, which changes the quantity of reflected light. The leak signals are derived from these changes. The address information of the groove G2 is reproduced by detecting the quantity of reflected light which varies when a light beam spot BG2 passes over the first second pit string P1 in the first address region and the second pit string P2 in the second address region. The address information of the land L2 is reproduced by detecting signals which leak from the second pit string P2 forming a pair, flanking the land L2, with another first pit string P1 of an identical arrangement when a light beam spot BL2 passes over the second address region.

Referring back to Laid-Open Patent Application 1 shown in FIG. 20, pits are arranged discretely on one side of the light beam spot, and therefore, asymmetric push-pull signals are produced and make it impossible to effect stable tracking when the light beam spot passes an address region following a land.

In contrast, in the optical disk in accordance with embodiment 3, the pit strings on both sides have an identical arrangement either in the first address region (the first pit string P1) or in the second address region (the second pit string P2). Therefore, when a light beam spot passes over an address region following a land, tracking is more stable with the optical disk in accordance with embodiment 3 compared to an optical disk in which pits are arranged discretely.

Further, although there exist places, such as the first address region following the land L2, where the pit strings on both sides are asymmetric during the scanning of the land, the light beam spot can scan substantially midway between the pit strings on both sides by, for example, setting the difference between the pit strings on both sides to only 1 bit, that is, by recording address information in grey codes, which enables a stable tracking operation.

Further, in the present embodiment, the addresses of the grooves G1 and G2 can be reproduced from the pit strings (first and second pit strings P1 and P2) following the groove G1 and G2. In such a case, the pits move passing through the center of the light beam spot and thereby cause large changes in the quantity of reflected light, enabling stable reproduction of addresses of the groove. The addresses of the lands L1 and L2 are reproduced from the pit strings of an identical arrangement provided on both sides of the lands L1 and L2, which also causes large changes in the quantity of reflected light than in the arrangement shown in FIGS. 2 and 3. In this case, however, the changes in the quantity of reflected light are not sufficiently large compared to the reproduction of address information of the grooves G1 and G2 since leak signals from those pits on both sides of the light beam spot need to be used for reproduction of address information.

Accordingly, in a modified example shown in FIG. 10, the pits constituting the first and second pit strings P1 and P2 are expanded in a radial direction so that their width WP is greater than the width, WG, of the groove and the width, WL, of the land which are formed with a substantially identical width. Consequently, those leak signals from the pits p1 and p2 provided along the edge of the light beam spot grow in reproduction of the addresses of the lands L1 and L2, which enables stable reproduction of addresses of the land.

A recording/reproducing device which records and reproduces data on the optical disk in accordance with embodiment 3 can be constructed similarly to the one shown in FIG. 25 in accordance with embodiment 1, and is capable of effecting a stable tracking control during the scanning of pit strings. If the present optical disk is of a phase change or other types such that no magnetic fields need to be applied, the magnetic field application device 104 and the magnetic field control section 106 are no longer necessary.

An optical disk substrate in accordance with embodiment 3 is fabricable similarly to that in accordance with embodiment 1. Such an optical disk substrate is fabricable by, when the address region is exposed in a laser cutting step, modulating the laser beam for exposure in terms of intensity using an optical modulator to produce pulses and exposing pits in synchronism with an adjacent groove.

An optical disk was fabricated as shown in FIG. 9 in accordance with embodiment 3 described above. The groove, land, and address pit had a common width (WG, WL, WP) of 0.3 μm. The address pit had a length (LP) of 0.6 μm. The gap between address pits had a length (DP) of 0.6 μm. (Note that for an optical disk for real use, the lengths LG and DP vary depending on the address information; however, here, they were set as above as an experimental condition.) The difference in levels was 40 nm. In these conditions, tracking operations were performed, each lasting 60 seconds, on the optical disk using a semiconductor laser with a wavelength of 410 nm and an optical pickup having an objective lens with a numerical aperture of 0.6. No error occurred in the tracking of a land. In contrast, an error did occur twelve seconds after the tracking was started on an optical disk with address pits shaped identically, but arranged conventionally, as shown in FIG. 20.

Another optical disk was fabricated as shown in FIG. 10 with the same specifications, except for the width, WP, of the address pits which was set to 0.4 µm, and then compared with an optical disk with the width, WP, of the address pit set to 0.3 µm. When the light beam spot BL1 passed over the address pit string, the former optical disk showed a 35% larger change in the quantity of reflected light than the latter one, which is due to the expansion of the width, WP, of the address pits to 0.4 µm.

Embodiment 4

Figure 11:
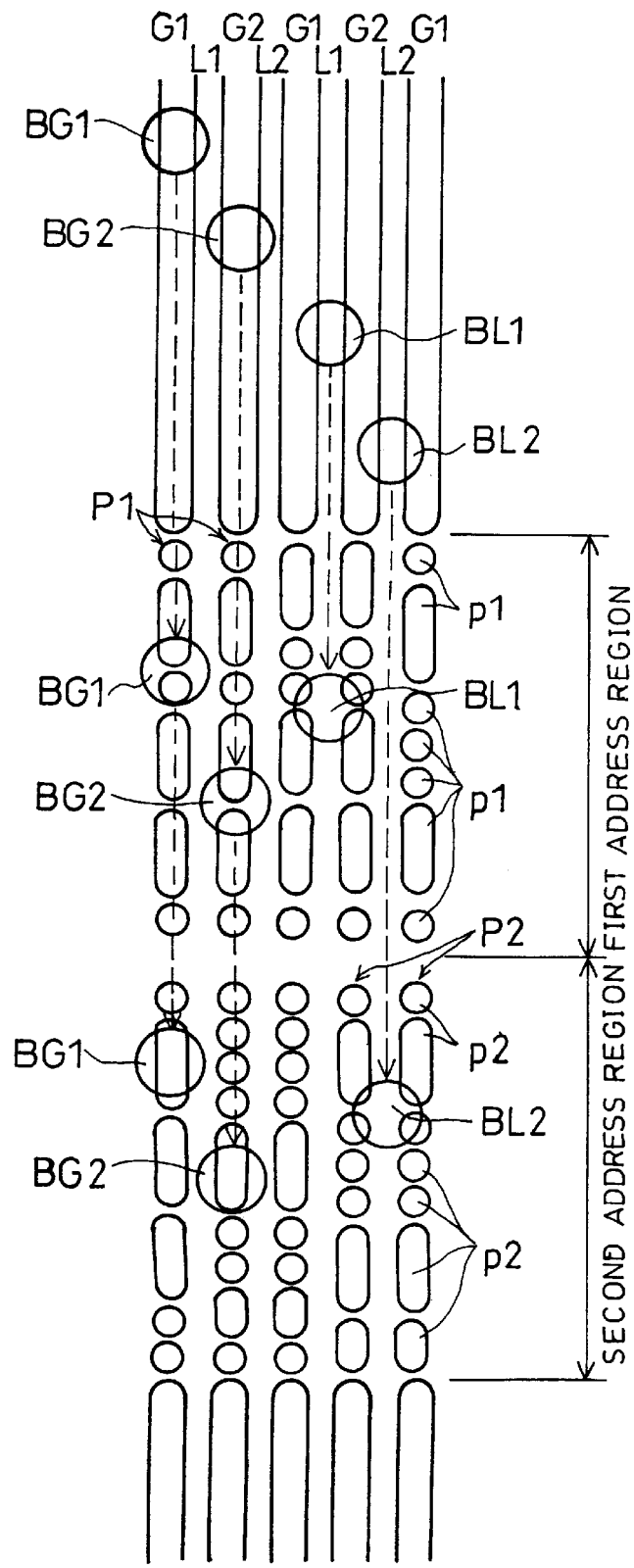
FIG. 11 is a plan view showing the structure of a recording track in the optical disk in accordance with embodiment 4 of the present invention.
Figure 12:
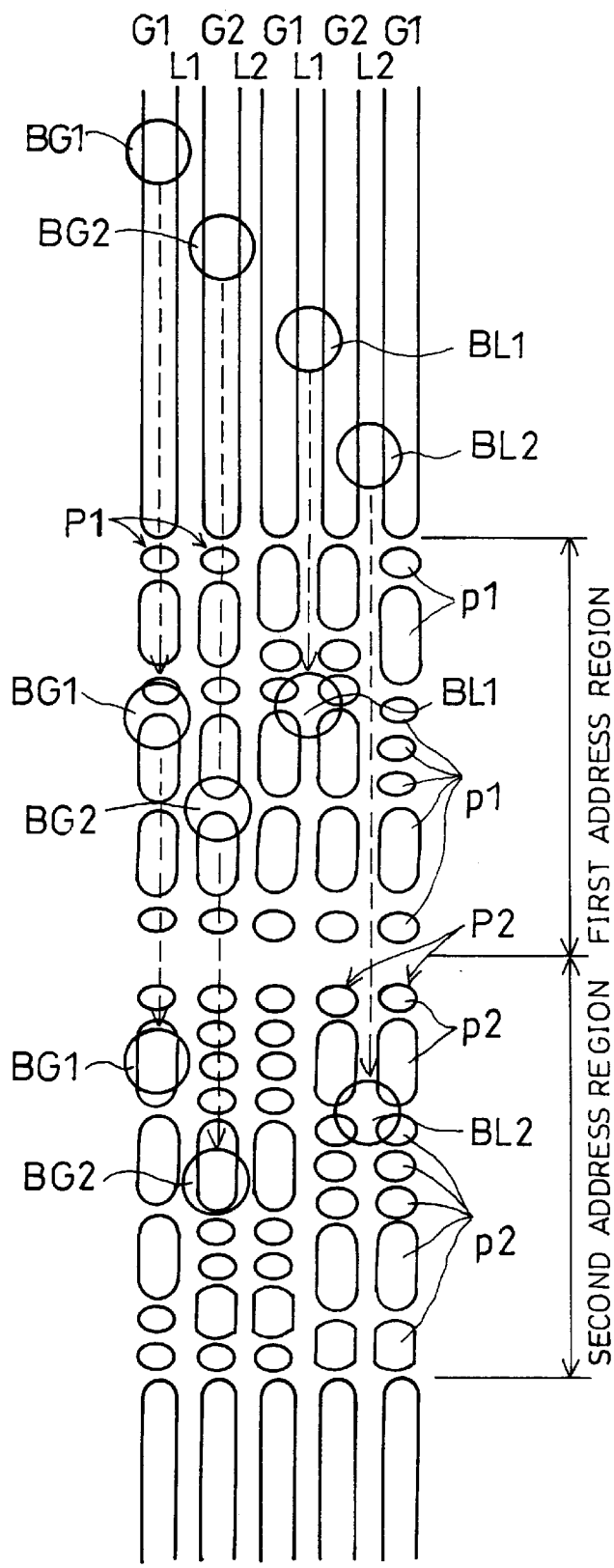
FIG. 12 is an enlarged plan view showing a modified example of the optical disk of FIG. 11.

The following will discuss embodiment 4 of the present invention in reference to FIGS. 11 and 12.

FIG. 11 is a plan view showing address regions on an optical disk substrate in accordance with embodiment 4. Such an optical disk in accordance with embodiment 4 has grooves G1 and G2 (first recording tracks) and lands L1 and L2 of a substantially identical width. Both the grooves G1 and G2 and the lands L1 and L2 are used as recording tracks. Address regions storing positional information of the optical disk include a first address region and a second address region which are displaced along the length of the track. The first and second address regions are located in the individual tracks at the same angular position.

In the first and second address regions, there are provided, following the grooves G1 and G2, first and second pit strings P1 and P2 respectively. The first pit string P1 in the first address region following any one of the grooves has the same arrangement as the first pit string P1 following one of the two adjacent grooves, either one closer to the circumference or one closer to the center of the disk. The second pit string P2 in the second address region has the same arrangement as the second pit string P2 following the other adjacent groove.

Specifically, letting inner and outer ends of the disk be designated as first and second sides respectively, or vice versa, a first pit string forms a pair with another first pit string in the first recording track adjacent to it on the first side with respect to a specific first pit string, so that the pair of first pit strings of an identical pit arrangement are provided within an identical angular range with respect to the disk center.

A second pit string forms a pair with another second pit string in the first recording track adjacent to it on the second side with respect to the second pit string following the specific first pit string, so that the pair of second pit strings of an identical pit arrangement are provided within an identical angular range with respect to the disk center.

In the optical disk in accordance with embodiment 4, gaps of an identical length are provided between pits constituting the first pit string P1 and the second pit string P2. The length of the gaps is specified not to exceed half the width of the pits p1 and p2 constituting the first and second pit strings P1 and P2 measured in a radial direction of the disk.

The address information of the groove G1 is reproduced by detecting the quantity of reflected light which varies when a light beam spot BG1 passes over the first pit string P1 in the first address region and the second pit string P2 in the second address region. The address information of the land L1 is reproduced by detecting signals which leak from the first pit string P1 forming a pair, flanking the land L1, with another first pit string P1 of an identical arrangement when a light beam spot BL1 passes over the first address region. As the light beam spot BL1 moves down along the land L1 and passes the first address region, the gaps in the first pit string P1 come in the light beam spot BL1, which changes the quantity of reflected light. The leak signals are derived from these changes. The address information of the groove G2 is reproduced by detecting the quantity of reflected light which varies when a light beam spot BG2 passes over the gaps in the first second pit string P1 in the first address region and in the second pit string P2 in the second address region. The address information of the land L2 is reproduced by detecting signals which leak from the second pit string P2 forming a pair, flanking the land L2, with another first pit string P1 of an identical arrangement when a light beam spot BL2 passes over the second address region.

In embodiment 4, the pit strings P1 and P2 constitute address pits. Tracking is more stable with the optical disk in accordance with embodiment 5 compared to an optical disk in which pits are arranged discretely, similarly to the one in embodiment 3. Moreover, the length of the gaps in the pit string is specified not to exceed half the width of the pits constituting the pit string measured in a radial direction of the disk. Therefore, tracking is more stable than in embodiment 3 for reasons similar to those mentioned in embodiment 1.

Further, in the present embodiment, the addresses of the grooves can be reproduced from the gaps in the pit strings following the grooves. In such a case, the gaps between pits move passing through the center of the light beam spot and thereby cause large changes in the quantity of reflected light, enabling stable reproduction of addresses of the groove. The addresses of the lands are reproduced from the pit strings of an identical arrangement provided on both sides of the lands, which also causes large changes in the quantity of reflected light than in the arrangement shown in FIGS. 2 and 3. In this case, however, the changes in the quantity of reflected light are not sufficiently large compared to the reproduction of address information of the grooves since leak signals from those pits on both sides of the light beam spot need to be used for reproduction of address information.

Accordingly, as shown in FIG. 12, the pits constituting the pit string are expanded in a radial direction so that their width is greater than the width, WG, of the groove and the width, WL, of the land which are formed with a substantially identical width. Consequently, those leak signals from the gaps between the pits provided along the edge of the light beam spot grow in reproduction of the addresses of the lands, which enables stable reproduction of addresses of the land.

A recording/reproducing device which records and reproduces data on the optical disk in accordance with embodiment 4 can be constructed similarly to the one shown in FIG. 25 in accordance with embodiment 1, and is capable of effecting a tracking control during the scanning of pit strings. If the present optical disk is of a phase change or other types such that no magnetic fields need to be applied, the magnetic field application device 104 and the magnetic field control section 106 are no longer necessary.

An optical disk substrate in accordance with embodiment 4 is fabricable similarly to that in accordance with embodiment 3. Such an optical disk substrate is fabricable by, when the address region is exposed in a laser cutting step, modulating the laser beam for exposure in terms of intensity using an optical modulator to produce pulses and exposing pits in synchronism with an adjacent groove.

An optical disk was fabricated as shown in FIG. 1 in accordance with embodiment 4 described above. The groove, land, and address pit had a common width (WG, WL, WP) of 0.3 µm. The address pit had a length (LP) of 0.6

μm. (Note that for an optical disk for real use, the length LG varies depending on the address information; however, here, they were set as above as an experimental condition.) The difference in levels was 40 nm. In these conditions, tracking operations were performed, each lasting 60 seconds, on the optical disk with various lengths, DP, of the gaps between address pits. Throughout the operations, the optical disk has a tangential tilt of 5 mrad. The semiconductor laser used had a wavelength of 410 nm and the optical pickup included an objective lens with a numerical aperture of 0.6. No error occurred in the tracking of a land when the length, DP, of the gap was 0.15 μm or less. In contrast, an error occurred in the tracking of a land when the length, DP, of the gap was more than 0.15 μm. For example, when the length, DP, of the gap was set to 0.22 μm, an error occurred forty five seconds after the tracking was started. This shows that more stable tracking is effected with the optical disk of FIG. 11 in accordance with embodiment 4 than with the optical disk of FIG. 9 in accordance with embodiment 3 when the optical disk has a tilt.

Another optical disk was fabricated as shown in FIG. 12 with the same specifications, except for the length, DP, of the gaps which was set to 0.11 μm and the width, WP, of the address pits which was set to 0.4 μm, and then compared with an optical disk with the length, DP, of the gaps set to 0.11 μm and the width, WP, of the address pit set to 0.3 μm. When the light beam spot BL1 passed over the address pit string, the former optical disk showed a 30% larger change in the quantity of reflected light than the latter one, which is due to the expansion of the width, WP, of the address pits to 0.4 μm.

Embodiment 5

Figure 13:
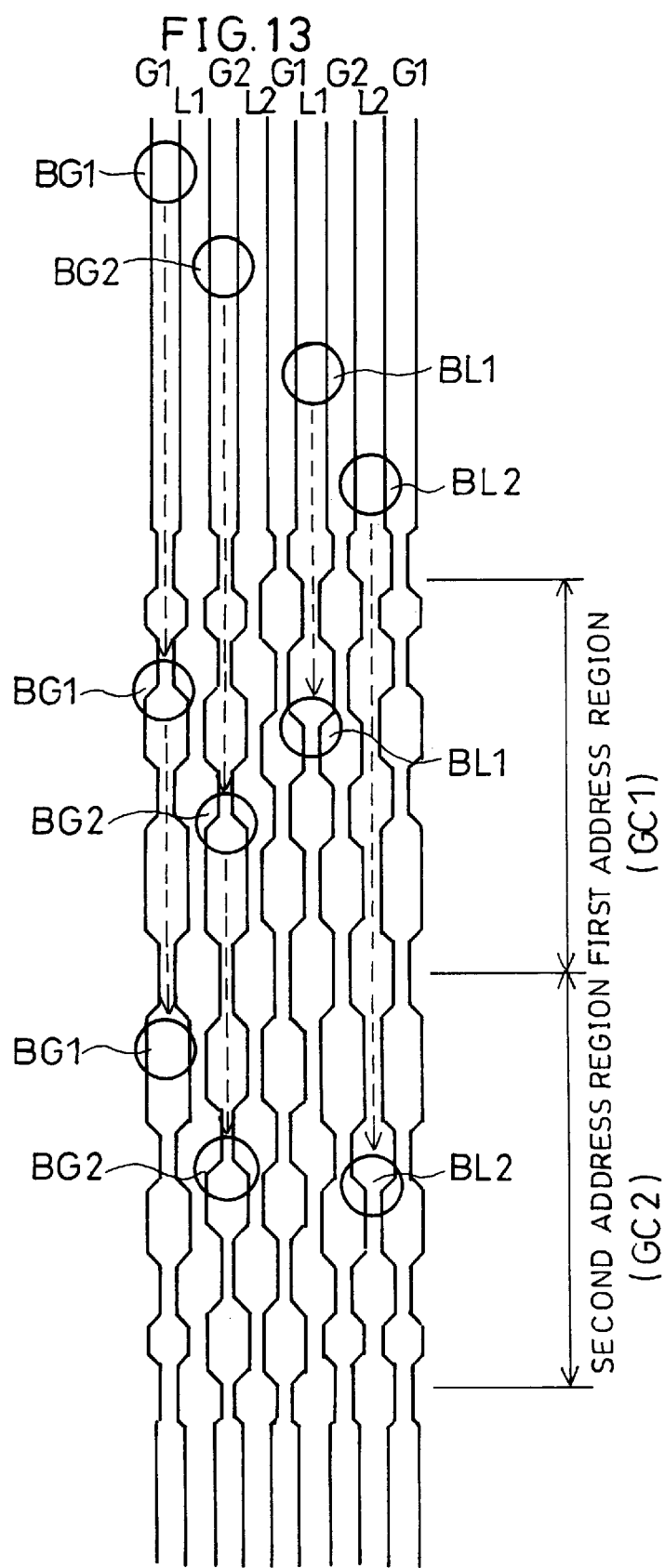
FIG. 13 is a plan view showing the structure of a recording track in the optical disk in accordance with embodiment 5 of the present invention.
Figure 14:
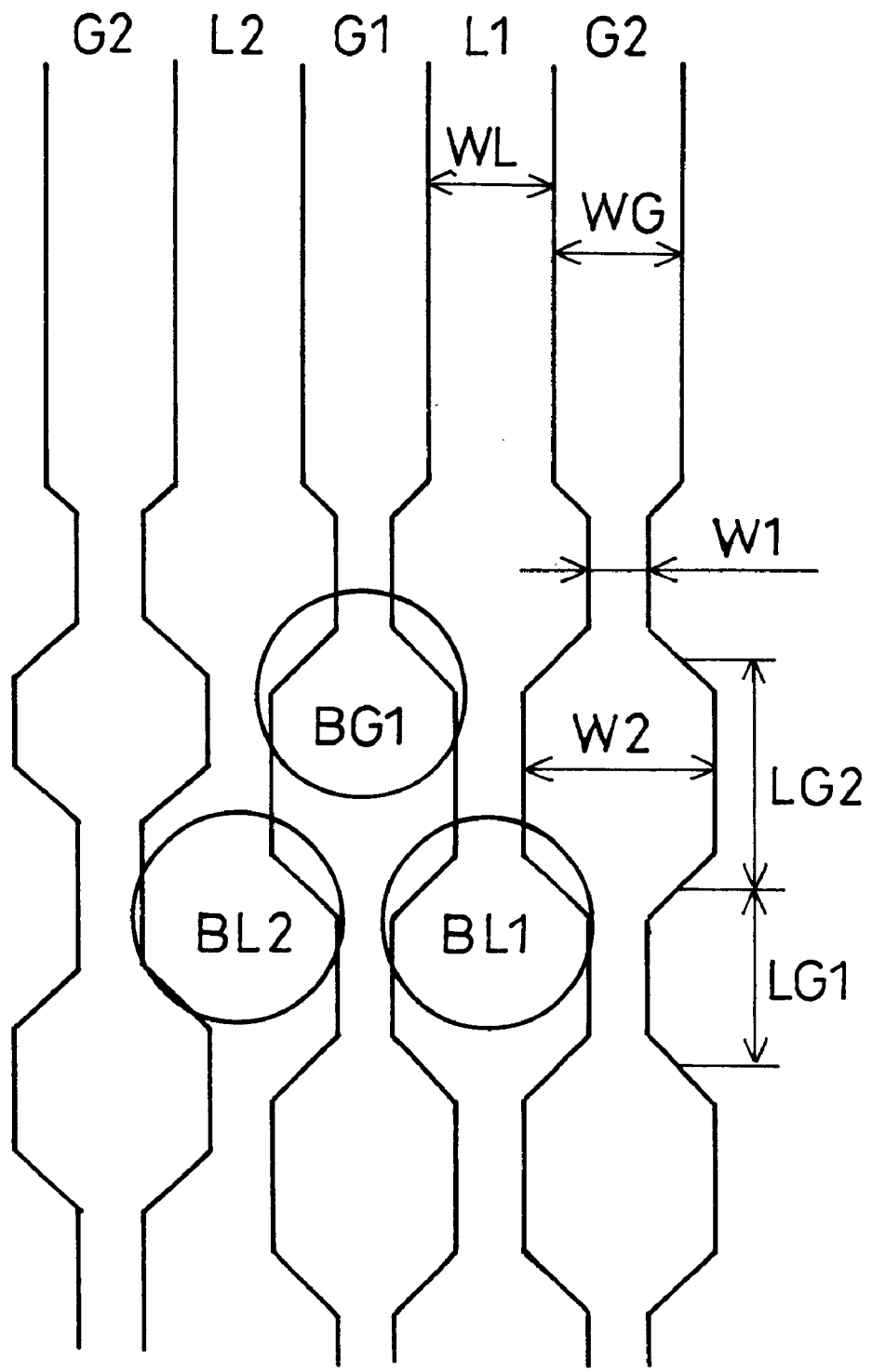
FIG. 14 is an enlarged a plan view showing a main part of the optical disk of FIG. 13.

The following will discuss embodiment 5 of the present invention in reference to FIGS. 13 and 14.

FIG. 13 is a plan view showing address regions on an optical disk substrate in accordance with embodiment 5. Such an optical disk in accordance with embodiment 5 has grooves G1 and G2 (first recording tracks) and lands L1 and L2 of a substantially identical width. Both the grooves G1 and G2 and the lands L1 and L2 are used as recording tracks. Address regions storing positional information of the optical disk include a first address region (first width varying portion GC1) and a second address region (second width varying portion GC2) which are displaced along the length of the track. The first and second address regions are located in the individual tracks at the same angular position.

Address information is stored in the first and second address regions as the widths of the grooves G1 and G2 which vary in a range of from the first groove width to the second groove width. In both the first and second address regions, the width of a groove varies in the same manner as does the width of one of the two adjacent grooves, either one closer to the circumference or one closer to the center of the disk, to store identical information.

As shown in FIG. 14, letting WG represent the width of the groove, WL the width of the lands, W1 the first groove width, and W2 the second groove width W2, the optical disk substrate is fabricated such that WG≈WL and W1<WG<W2. The two sidewalls of the groove is formed to wobble substantially equally to vary the width of the groove.

The address information of the groove G1 is reproduced by detecting the quantity of reflected light which varies when a light beam spot BG1 passes over the first address region and the second address region where the groove G1 changes its width. The address information of the land L1 is reproduced by detecting the quantity of reflected light which varies when a light beam spot BL1 passes over the first address region where the flanking grooves change their widths identically and the land L1 thereby changes its width. The address information of the groove G2 is reproduced by detecting the quantity of reflected light which varies when a light beam spot BG2 passes over the first address region and the second address region where the groove G2 changes its width. The address information of the land L2 is reproduced by detecting the quantity of reflected light which varies when a light beam spot BL2 passes over the second address region where the flanking grooves change their widths identically and the land L2 thereby changes its width.

Referring back to embodiment 2, the variations in the quantity of reflected light are smaller in the reproduction of the address of the land than in the reproduction of the address of the groove, since in the land, only one of the two sidewalls changes under the light beam spot. In contrast, in the present embodiment, the grooves flanking the land change identically; therefore, the address of the land is reproduced based on large variations in the quantity of reflected light in the same manner as the address of the groove is reproduced.

FIG. 14 is an enlarged view showing the first address region on the optical disk in accordance with the present invention shown in FIG. 13. The address information of the groove G1 is reproduced when the light beam spot BG1 passes over the first address region. In the first address region, the width of the groove varies symmetrically with respect to the center of the light beam spot BG1. Therefore, push-pull signals are symmetric, which effects stable tracking. As for the land L1, a light beam spot BL1 scans the symmetric land L1. Therefore, push-pull signals are symmetric, which effects stable tracking.

The edge between the land and the groove in the address region which is varied symmetrically with respect the extension line of the edge between the land L1 and the groove G1 in the data region further improves symmetry of the push-pull signals in the address region where the grooves flanking the land show asymmetric variations (for example, when the light beam spot BL2 to scan the land L2 passes over the first address region), thereby effecting more stable tracking.

As detailed so far, in the present embodiment, the edge between the land and the groove in the address region which is varied symmetrically with respect the extension line of the edge between the land L1 and the groove G1 in the data region effects stable tracking. Therefore, the optical disk substrate is preferably formed such that (WG−W1)≈(W2−WG) where WG denotes the width of the groove, W1 the first groove width W1, and W2 the second groove width W2.

A recording/reproducing device which records and reproduces data on the optical disk in accordance with embodiment 5 can be constructed similarly to the one shown in FIG. 25 in accordance with embodiment 1, and is capable of effecting a stable tracking control even in the first width varying portion and the second width varying portion. If the present optical disk is of a phase change or other types such that no magnetic fields need to be applied, the magnetic field application device 104 and the magnetic field control section 106 are no longer necessary.

An optical disk substrate in accordance with embodiment 5 is fabricable similarly to that in accordance with embodiment 1. Such an optical disk substrate is fabricable by, when the address region is exposed in a laser cutting step, modulating the laser beam in terms of intensity using an optical modulator and carrying out exposure in synchronism with an adjacent groove.

An optical disk was fabricated as shown in FIG. 13 in accordance with embodiment 5 described above. The groove and land had a common width (WG, WL) of 0.3 µm. The parts of the groove where its width equals the first and second groove widths were commonly 0.6 µm long (LG1 and LG2) Note that for an optical disk for real use, the lengths LG1 and LG2 vary depending on the address information; however, here, they were set as above as an experimental condition.) The difference in levels was 40 nm. In these conditions, tracking operations were performed, each lasting 60 seconds, on the optical disk with the first groove width W1 set to 0.2 µm and the second groove width W2 set to 0.4 µm. The semiconductor laser used had a wavelength of 410 nm and the optical pickup included an objective lens with a numerical aperture of 0.6. No error occurred in the tracking of a land. Referring back to the optical disk in accordance with embodiment 2 shown in FIG. 7, the variations in the quantity of reflected light are smaller in the reproduction of the address of the lands L1 and L2 than in the reproduction of the address of the grooves G1 and G2, since in the lands L1 and L2, only one of the two sidewalls changes. As to the optical disk in accordance with embodiment 5 shown in FIG. 13, the grooves flanking the land change identically in the reproduction of the address information of the lands L1 and L2; therefore, the address of the land is reproduced based on substantially as large variations in the quantity of reflected light as those obtained in the reproduction of the address information of the grooves G1 and G2.

Embodiment 6

Figure 15:
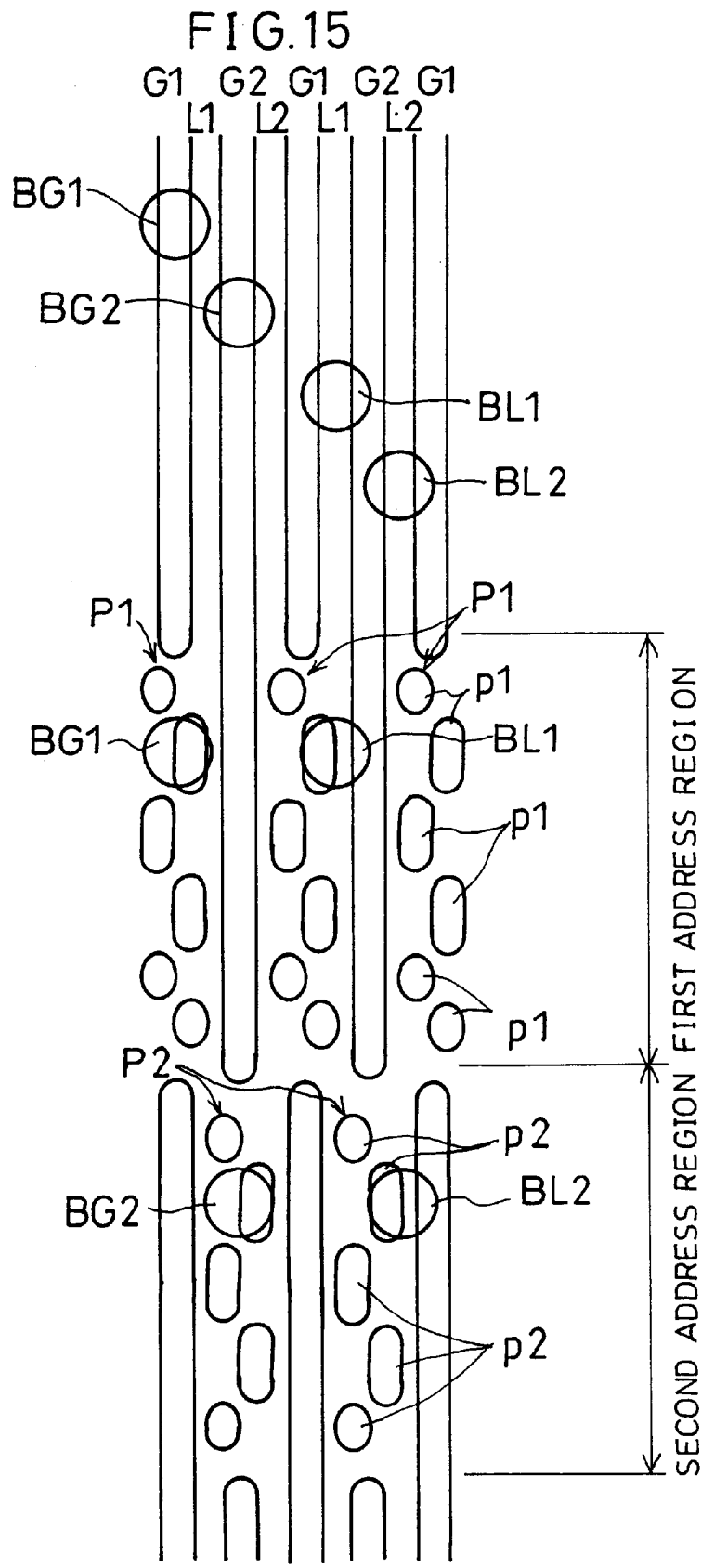
FIG. 15 is a plan view showing the structure of a recording track in the optical disk in accordance with embodiment 6 of the present invention.
Figure 16:
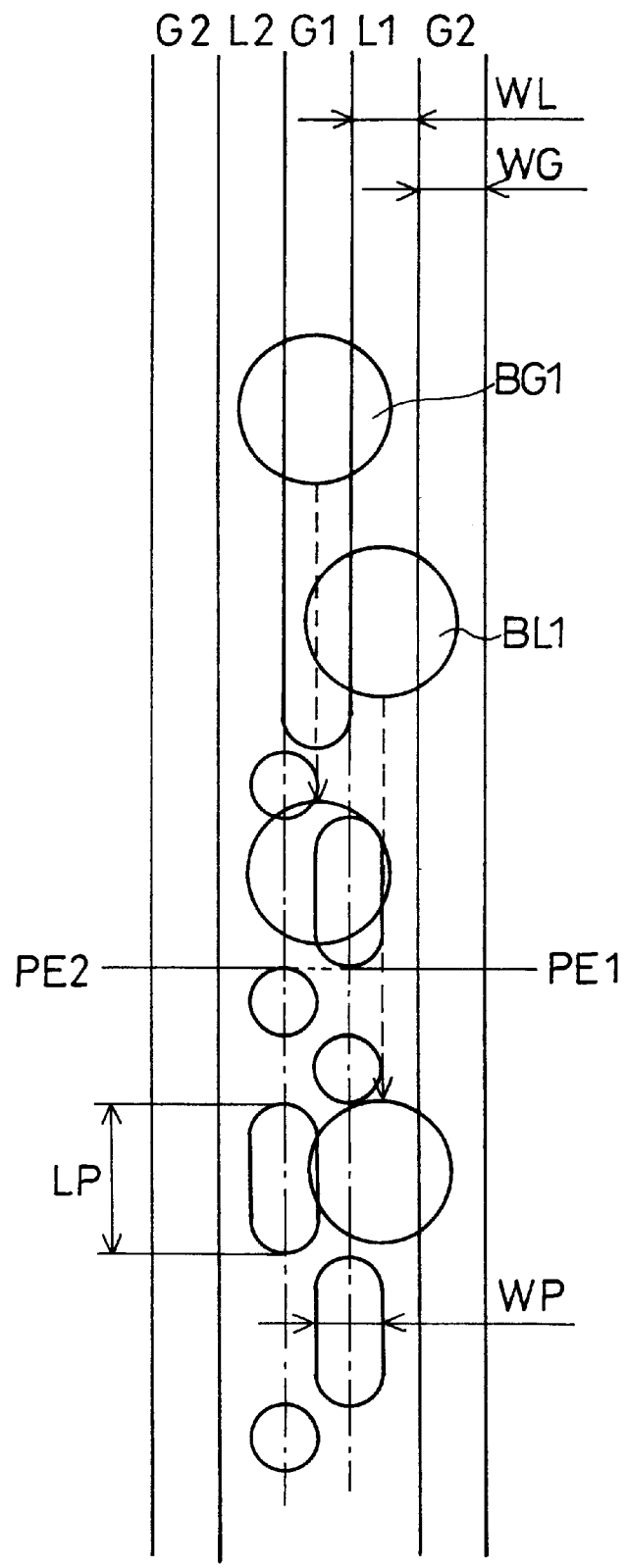
FIG. 16 is an enlarged a plan view showing a main part of the optical disk of FIG. 15.
Figure 17:
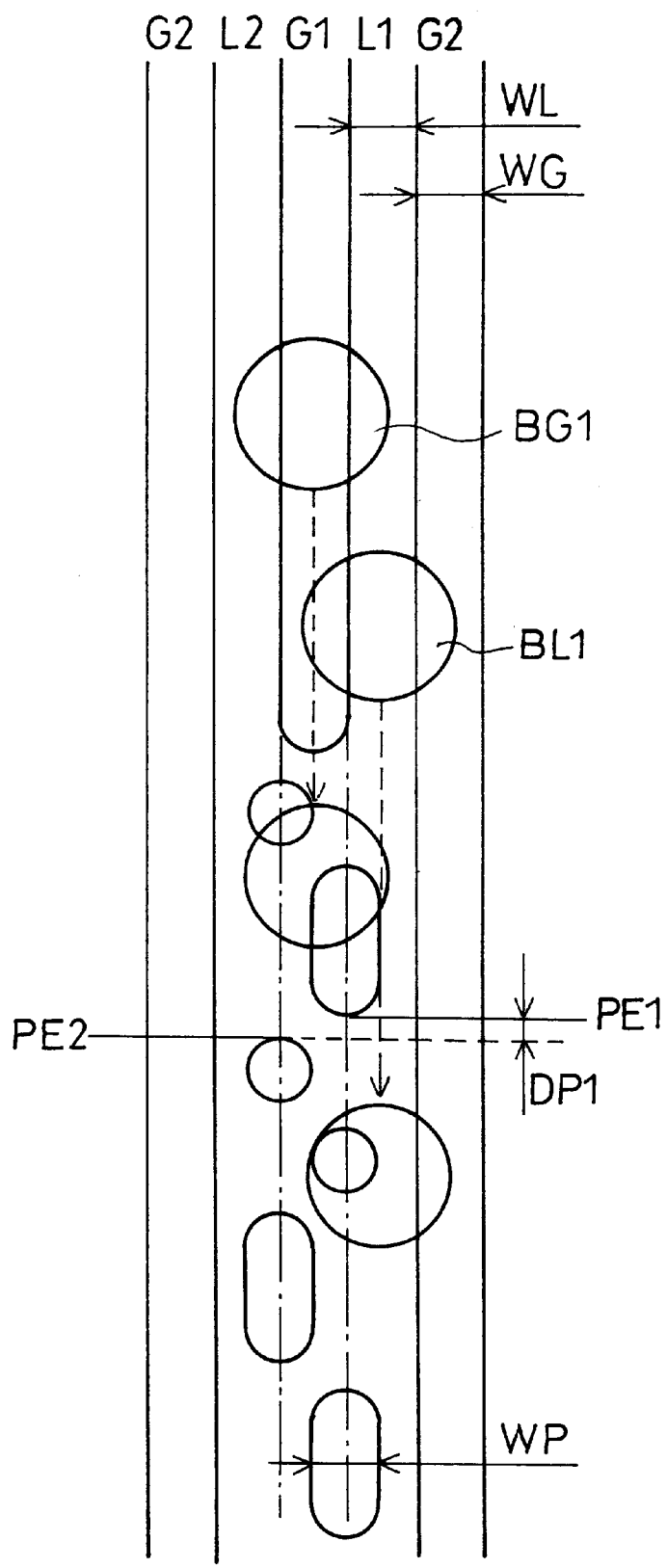
FIG. 17 is an enlarged plan view showing a modified example of the optical disk of FIG. 15.

The following will discuss embodiment 6 of the present invention in reference to FIG. 15 to FIG. 17.

FIG. 15 is a plan view showing address regions on an optical disk substrate in accordance with embodiment 6. Such an optical disk in accordance with embodiment 6 has grooves G1 and G2 (first recording tracks) and lands L1 and L2 of a substantially identical width. Both the grooves G1 and G2 and the lands L1 and L2 are used as recording tracks.

Address regions storing positional information of the optical disk include a first address region and a second address region which are displaced along the length of the track. The first and second address regions are located in the individual tracks at the same angular position. In the first address region, there is provided, following the groove G1, a first wobbling pit string P1 having concavities and convexities in which the first address information is stored. In the second address region, there is provided, following the groove G2, a second wobbling pit string P2 having concavities and convexities in which the second address information is stored.

Figure 22:
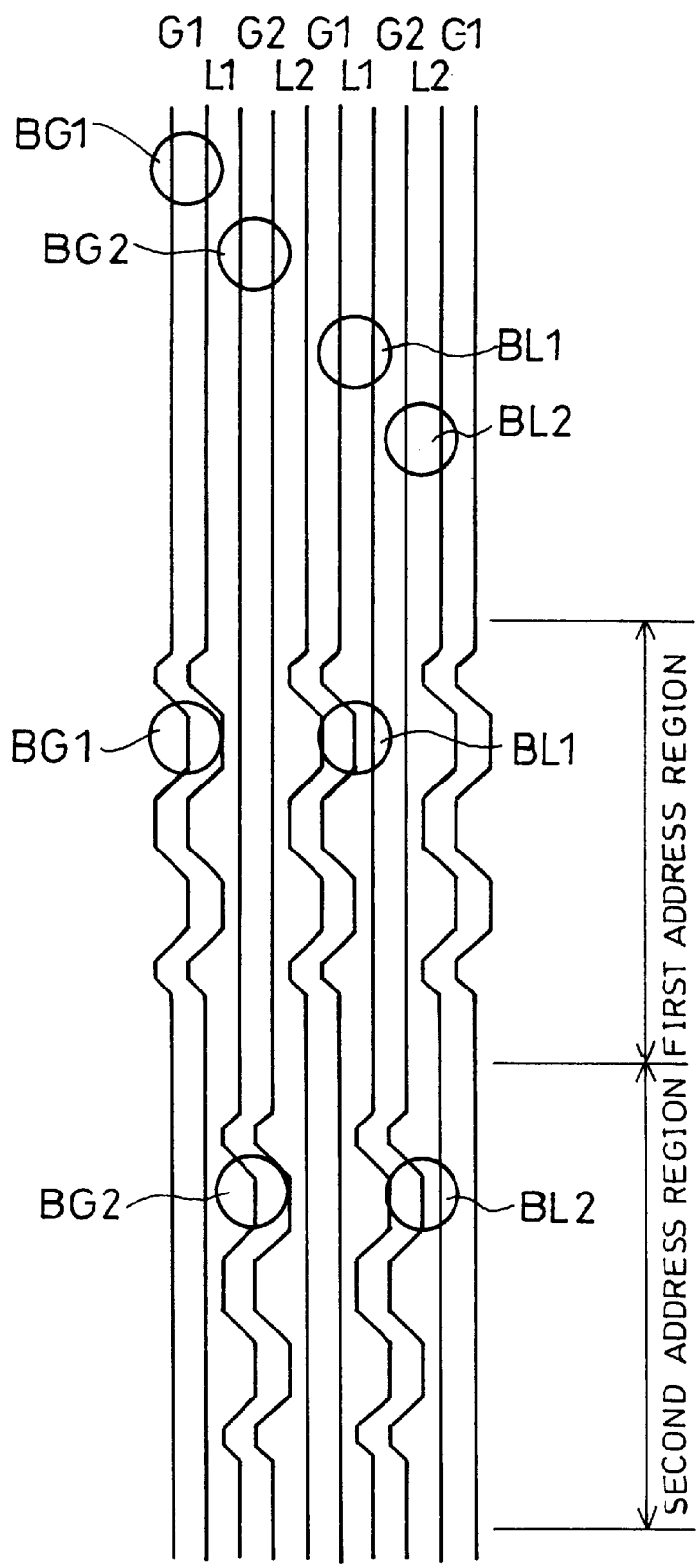
FIG. 22 is a plan view illustrating another conventional optical disk.

Referring back to the optical disk disclosed in Laid-Open Patent Application 2 and shown in FIG. 22, address information is stored, following the grooves (G1 and G2), in the address region as the right and left wobbling of the groove. The wobbling of the groove is detected through variations in the quantity of reflected light or in push-pull signals. Since the groove wobbles right and left continuously, the variations in the quantity of reflected light and in push-pull signals are continuous. Therefore, reproduction jitter grows in the reproduction of address information, resulting in an increase in address detection errors.

In contrast, on the optical disk in accordance with embodiment 6, address information is stored in the address region as the wobbling pit string which wobbles right and left and reproduced from the wobbling of the groove. The wobbling pits are not formed continuously, and the wobbling changes sharply at pit edges. This enables reduction in reproduction jitter and address detection errors.

FIG. 16 is an enlarged view showing the first address region on the optical disk in accordance with the present invention of FIG. 15. The address information of the groove G1 is reproduced by detecting the quantity of a push-pull signal which varies when a light beam spot BG1 passes over the wobbling pit string P1 in the first address region. The push-pull signal is asymmetric because of the asymmetric arrangement of address pits. However, the address pits are provided alternately to the right and left, enabling the light beam spot BG1 to scan along the extension line of the groove G1 to effect stable tracking.

The address information of the land L1 is reproduced by detecting a push-pull signal which varies when a light beam spot BL1 passes on the right of the wobbling pit string P1 in the first address region.

Now, the interval between pits in wobbling pit strings will be explained. Reference is made to FIG. 17. When the interval DP1 between pits constituting a wobbling pit string is increased, the area with no pits in it increases. This induces asymmetry in push-pull signals and a sharp increase in the quantity of reflected light in areas where there are no pits, and makes it difficult to reproduce wobble information in a stable manner. Therefore, to reproduce wobble information in a stable manner, the interval DP1 is preferably equal to, or less than the width, WG, of the groove.

Figure 18:
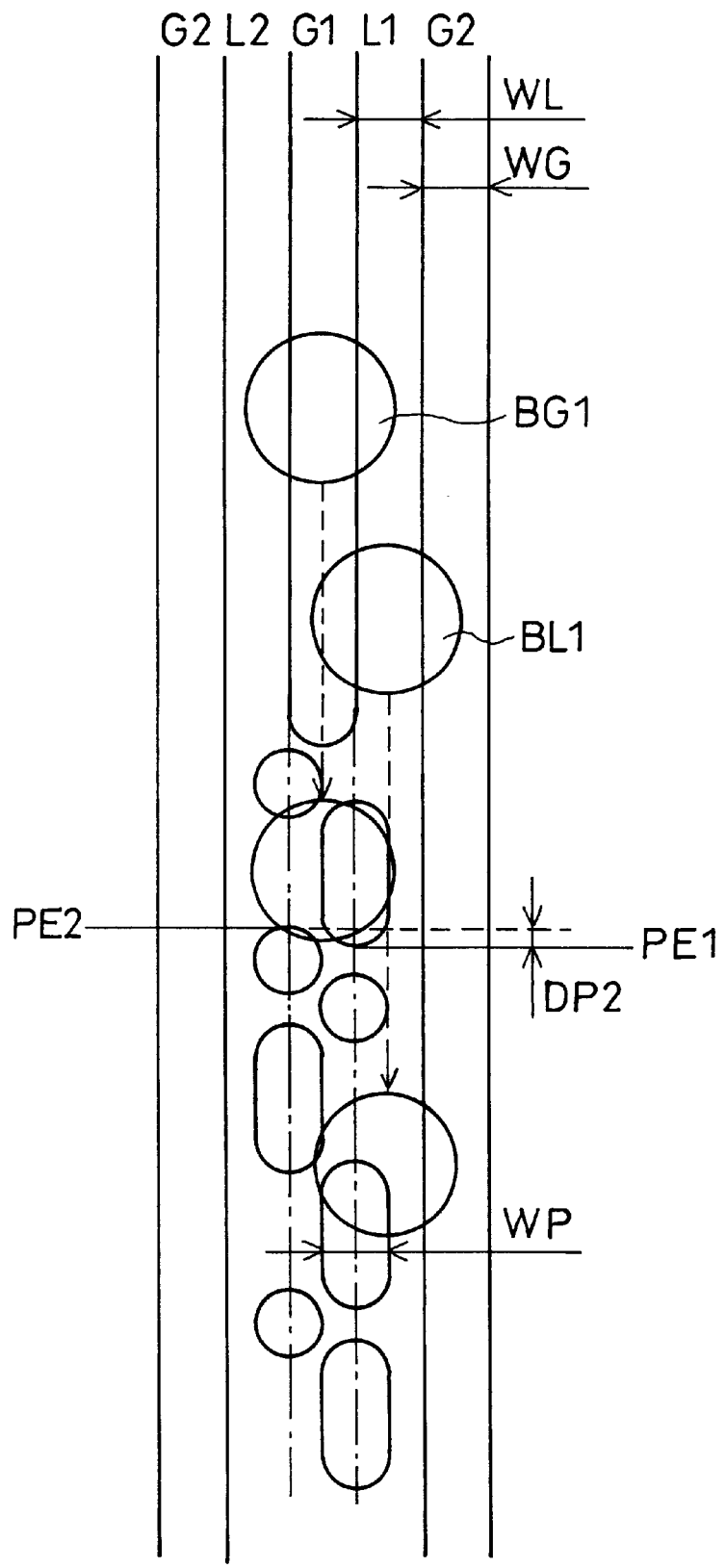
FIG. 18 is an enlarged plan view showing a comparative example for the optical disk of FIG. 15.

Alternatively, wobbling pits may be formed to partly overlap as shown in FIG. 18. To enable reduction in reproduction jitter and address detection errors in the reproduction of address information, it is essential to form wobbling pits so that at least no successive pits touch each other.

Accordingly, pits are preferably formed so that, as shown in FIG. 16, the rear edge PE1 of a pit P1 and the front edge PE2 of the subsequent pit P1 in the address pit string are located substantially side by side.

A recording/reproducing device which records and reproduces data on the optical disk in accordance with embodiment 6 can be constructed similarly to the one shown in FIG. 25 in accordance with embodiment 1, and is capable of effecting a stable tracking control even in the scanning of the wobbling pit string. If the present optical disk is of a phase change or other types such that no magnetic fields need to be applied, the magnetic field application device 104 and the magnetic field control section 106 are no longer necessary.

Figure 19:
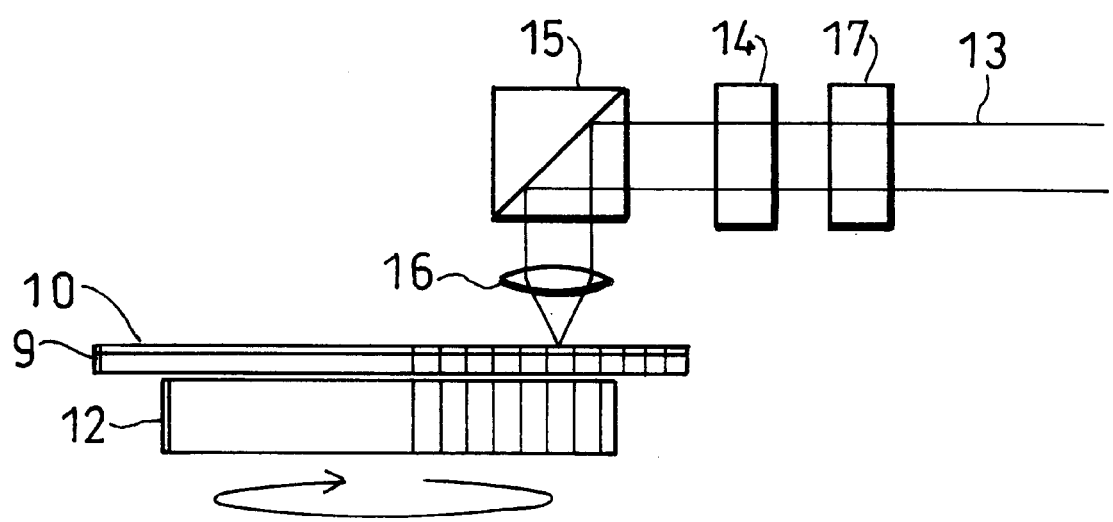
FIG. 19 is a drawing illustrating exposure of the optical disk in accordance with the present invention.

An optical disk substrate in accordance with embodiment 6 is fabricable by a similar process as in embodiment 1, using a cutting device (exposure device) shown in FIG. 19. To fabricate such an optical disk substrate, when the address region is exposed in a laser cutting step, the laser beam for exposure is caused to wobble by an optical polarizer 17 and modulated into pulses by an optical modulator 14 in synchronism with the wobbling. An optical disk was fabricated as shown in FIG. 16 in accordance with the description. The groove, land, and wobbling pit had a common width (WG, WL, WP) of 0.3 µm. The wobbling pit had a length LP of 0.6 µm. The difference in levels of concavities and convexities was 40 nm. In the optical disk, the rear edge PE1 of a pit and the front edge PE2 of the subsequent pit P1 in the address pit string are located substantially side by side. As a comparative example 6, another optical disk was fabricated as shown in FIG. 22 with 0.3 µm-wide (WL) lands, 0.3 µm-wide (WG), 0.6 µm-cycle wobbling grooves, and a 40 nm difference in levels of concavities and convexities.

The address of L1 was reproduced from the optical disks in accordance with the embodiment 6 and comparative example 6 based on push-pull signals, using a semiconductor laser and an optical pickup. The semiconductor laser used had a wavelength of 410 nm and the optical pickup included an objective lens with a numerical aperture of 0.6. An 8% jitter was observed in the address reproduction signal from the land L1 of comparative example 6, while only a 5% jitter was included in the address reproduction signal from the land L1 of embodiment 6. This confirms that embodiment 6 successfully improved precision in the reproduction of address information.

An identical examination was carried out on an optical disk with each interval between wobbling pits specified to DP1 as shown in FIG. 17. When DP1 was equal to, or less than, 0.30 μm, each pit was separated from the others, and the address information could be reproduced with a 5% jitter like in the case of the address reproduction signal from the land L1 of embodiment 6. However, when DP1 was increased exceeding 0.30 μm, the jitter in the address reproduction signal grew gradually. With DP1 as large as 0.40 μm, the address reproduction signal had a 9% jitter. Therefore, in the present embodiment, to effect a stable reproduction of wobbling information, the interval, DP1, between pits should not exceed the width, WG, of the groove.

An identical examination was carried out on an optical disk with successive wobbling pits overlapping a length of DP2 as shown in FIG. 18. When DP2 was 0.1 μm, each pit was separated from the others, and the address information could be reproduced with a 5% jitter like the address reproduction signal from the land L1 of embodiment 6. However, when DP2 was 0.13 μm, each pit could not formed separately from the others, and successive pits were formed too close to each other. The result was an 8% jitter in the address reproduction signal like the case of L1 of comparative example 6. Therefore, in the present embodiment, to effect stable reproduction of wobbling information, it is essential to form wobbling pits so that at least no successive pits touch each other.

The description, so far, has been discussing the present invention by way of embodiments 1 to 6. The embodiments are not intended to be restrictive, and various modifications are possible within the scope of the present invention. For example, when the optical disk is separated into zones for every predetermined radius, the first address region and the second address region which were located at the same angular position in individual tracks throughout embodiments 1 to 6 may be alternatively located at the same angular position for each zone.

In embodiments 1, 3, 4, and 6, pit strings (wobbling pit strings) were provided following grooves; they may be alternatively provided following lands. Note that in the present invention the expressions "following a groove" and "following a land" encompass "in a groove" and "on a land".

The width varying portions were provided to grooves in embodiments 2 and 5; alternatively, they may be provided to lands. In the foregoing embodiments, address information was stored by pit string width varying portions and wobbling pit strings; however, the present invention is also applicable when other kind of information is stored in advance in tracks (at least, for example, such information that differ between two adjacent grooves).

An optical disk in accordance with the present invention utilizes both a groove and a land as a recording track and includes:
first pit strings and second pit strings of pits lined along a length of a track, provided sequentially in first recording tracks which are either grooves or lands, wherein:
letting inner and outer ends of the disk be designated as first and second sides respectively, or vice versa,
a first pit string forms a pair with another first pit string in a first recording track which is adjacent thereto on the first side with respect to a specific first pit string, so that the pair of first pit strings of an identical pit arrangement are provided within an identical angular range with respect to a center of the disk; and
a second pit string forms a pair with another second pit string in a first recording track adjacent thereto on the second side with respect to the second pit string following the specific first pit string, so that the pair of second pit strings of an identical pit arrangement are provided within an identical angular range with respect to the center of the disk.

An optical disk in accordance with the present invention utilizes both a groove and a land as a recording track and includes:
first width varying portions each having a track width which varies between a first width and a second width and second width varying portions each having a track width which varies between a first width and a second width, the first and second width varying portions being provided sequentially in first recording tracks which are either grooves or lands,
letting inner and outer ends of the disk be designated as first and second sides respectively, or vice versa,
a first width varying portion forms a pair with another first width varying portion in a first recording track which is adjacent thereto on the first side with respect to a specific first width varying portion, so that the pair of first width varying portions having an identical arrangement of the first and second widths are provided within an identical angular range with respect to a center of the disk;
a second width varying portion forms a pair with another second width varying portion in a first recording track adjacent thereto on the second side with respect to the second width varying portion following the specific first width varying portion, so that the pair of second width varying portions having an identical arrangement of the first and second widths are provided within an identical angular range with respect to the center of the disk; and
WG≈WL and W1<WG<W2, where WG is a width of the groove, WL is a width of the land, W1 is the first width, and W2 is the second width.

An optical disk in accordance with the present invention has a groove and a land,
wherein
address information is stored in a string of pits lined along a length of a track, some of the pits being located relatively close to a center of the disk and the others relatively close to a circumference of the disk so that the pit string extends along the length of a track, but wobbles in a radial direction of the disk.

An optical disk in accordance with the present invention utilizes both a groove and a land as a recording track and includes:
a wobbling pit string constituted by:
an inner string of pits lined along a length of a track in an inner side of a central line of a track in a radial direction of the disk; and
an outer string of pits lined along a length of a track in an outer side of a central line of a track in a radial direction of the disk, the outer string being displaced off the inner string along a length of a track.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical disk utilizing both a groove and a land as a recording track, comprising:
a first pit string of pits lined along a length of a track, provided in a first recording track which is either a groove or a land; and
a second pit string of pits lined along a length of a track, provided in a first recording track which is adjacent, in a radial direction of the disk, to the first recording track in which the first pit string is provided,
wherein:
the second pit string is displaced off the first pit string along a length of a track so as not to overlap the first pit string in a radial direction of the disk; and
an interval between two pits which are adjacent along a length of a track in the first and second pit strings is specified to be equal to, or less than, half a width of the two pits measured in a radial direction of the disk.

2. The optical disk as set forth in claim 1,
wherein:
a width of the pits measured in a radial direction of the disk in the first and second pit strings is greater than a width of the groove and the land.

3. The optical disk as set forth in claim 1,
wherein:
the first and second pit strings store address information.

4. The optical disk as set forth in claim 2,
wherein:
a mean width of the pits measured in a radial direction of the disk in the first and second pit strings, including gaps between pits which are adjacent along a length of a track, is specified so as to be substantially equal to the width of the groove or the land, measured in a radial direction of the disk, in which the first and second pit strings are provided.

5. A recording/reproducing device for recording/reproducing information by emitting a light beam onto the optical disk as set forth in claim 1, comprising:
tracking control means for controlling the light beam to scan a desired recording track,
wherein:
the tracking control means performs a tracking control even when the light beam scans the first and second pit strings.

6. An optical disk utilizing both a groove and a land as a recording track, comprising:
a first width varying portion, having a track width which varies between a first width and a second width, provided in a first recording track which is either a groove or a land; and
a second width varying portion, having a track width which varies between a first width and a second width, provided in a first recording track which is adjacent, in a radial direction of the disk, to the first recording track in which the first width varying portion is provided,
wherein:
the second width varying portion is displaced off the first width varying portion along a length of a track so as not to overlap the first width varying portion in a radial direction of the disk; and
$WG \approx WL$ and $W1 < WG < W2$, where WG is a width of the groove, WL is a width of the land, W1 is the first width, and W2 is the second width.

7. The optical disk as set forth in claim 6,
wherein:
the width of the groove WG, the first width W1, and the second width W2 satisfy an equation:

$$(WG-W1) \approx (W2-WG).$$

8. The optical disk as set forth in claim 6,
wherein:
the first and second width varying portions store address information.

9. A recording/reproducing device for recording/reproducing information by emitting a light beam onto the optical disk as set forth in claim 6, comprising:
tracking control means for controlling the light beam to scan a desired recording track,
wherein:
the tracking control means performs a tracking control even when the light beam scans the first width varying portion and the second width varying portion.

10. An optical disk utilizing both a groove and a land as a recording track, comprising:
first pit strings and second pit strings of pits lined along a length of a track, provided sequentially in first recording tracks which are either grooves or lands,
wherein:
letting inner and outer ends of the disk be designated as first and second sides respectively, or vice versa,
a first pit string forms a pair with another first pit string in a first recording track which is adjacent thereto on the first side with respect to a specific first pit string, so that the pair of first pit strings of an identical pit arrangement are provided within an identical angular range with respect to a center of the disk; and
a second pit string forms a pair with another second pit string in a first recording track adjacent thereto on the second side with respect to the second pit string following the specific first pit string, so that the pair of second pit strings of an identical pit arrangement are provided within an identical angular range with respect to the center of the disk.

11. The optical disk as set forth in claim 10,
wherein:
an interval between two pits which are adjacent along a length of a track in the first and second pit strings is specified to be equal to, or less than, half a width of the two pits measured in a radial direction of the disk.

12. The optical disk as set forth in claim 10,
wherein:
a width of the pits measured in a radial direction of the disk in the first and second pit strings is greater than a width of the groove and the land.

13. The optical disk as set forth in claim 10,
wherein:
the first and second pit strings store address information.

14. A recording/reproducing device for recording/reproducing information by emitting a light beam onto the optical disk as set forth in claim 10, comprising:
tracking control means for controlling the light beam to scan a desired recording track,
wherein:
the tracking control means performs a tracking control even when the light beam scans the first and second pit strings.

15. An optical disk utilizing both a groove and a land as a recording track, comprising:

first width varying portions each having a track width which varies between a first width and a second width and second width varying portions each having a track width which varies between a first width and a second width, the first and second width varying portions being provided sequentially in first recording tracks which are either grooves or lands, letting inner and outer ends of the disk be designated as first and second sides respectively, or vice versa, a first width varying portion forms a pair with another first width varying portion in a first recording track which is adjacent thereto on the first side with respect to a specific first width varying portion, so that the pair of first width varying portions having an identical arrangement of the first and second widths are provided within an identical angular range with respect to a center of the disk;

a second width varying portion forms a pair with another second width varying portion in a first recording track adjacent thereto on the second side with respect to the second width varying portion following the specific first width varying portion, so that the pair of second width varying portions having an identical arrangement of the first and second widths are provided within an identical angular range with respect to the center of the disk; and WG≈WL and W1<WG<W2, where WG is a width of the groove, WL is a width of the land, W1 is the first width, and W2 is the second width.

16. The optical disk as set forth in claim 15, wherein:
the width of the groove WG, the first width W1, and the second width W2 satisfy an equation:

(WG−W1)≈(W2−WG).

17. The optical disk as set forth in claim 15, wherein:
the specific first width varying portion and a first width varying portion in a first recording track adjacent thereto on the second side have second width portions which are formed so as to oppose each other; and the second width varying portion following the specific first width varying portion and a second width varying portion in a first recording track adjacent thereto on the first side with respect to the second width varying portion have second width portions which are formed so as to oppose each other.

18. The optical disk as set forth in claim 15, wherein:
the first and second width varying portions store address information.

19. A recording/reproducing device for recording/reproducing information on the optical disk as set forth in claim 15, comprising:

tracking control means for controlling a light beam to scan a desired recording track, wherein:
the tracking control means performs a tracking control even when the light beam scans the first width varying portion and the second width varying portion.

20. An optical disk with a groove and a land, wherein
address information is stored in a string of pits lined along a length of a track, some of the pits being located relatively close to a center of the disk and the others relatively close to a circumference of the disk so that the pit string extends along the length of a track, but wobbles in a radial direction of the disk.

21. The optical disk as set forth in claim 20, wherein:
the pits are positioned symmetrically with respect to a central line of the track and alternately relatively close to the center and relatively close to the circumference.

22. The optical disk as set forth in claim 20, wherein:
an interval between two pits which are adjacent along a length of a track in the wobbling pit string is specified to be equal to, or less than, half a width of the two pits measured in a radial direction of the disk.

23. The optical disk as set forth in claim 20, wherein:
a rear edge of a pit and a front edge of a subsequent pit in the wobbling pit string are located substantially side by side in a radial direction of the disk.

24. A recording/reproducing device for recording/reproducing information on the optical disk as set forth in claim 20, comprising:

tracking control means for controlling a light beam to scan a desired recording track, wherein:
the tracking control means performs a tracking control even when the light beam scans the wobbling pit string.

25. An optical disk utilizing both a groove and a land as a recording track, comprising:

a wobbling pit string constituted by:
an inner string of pits lined along a length of a track in an inner side of a central line of a track in a radial direction of the disk; and an outer string of pits lined along a length of a track in an outer side of a central line of a track in a radial direction of the disk, the outer string being displaced off the inner string along a length of a track, wherein the wobbling pit string stores address information therein.

26. The optical disk as set forth in claim 25, wherein:
an interval between two pits which are adjacent along a length of a track in the wobbling pit string is specified to be equal to, or less than, half a width of the two pits measured in a radial direction of the disk.

27. The optical disk as set forth in claim 25, wherein:
a rear edge of a pit and a front edge of a subsequent pit in the wobbling pit string are located substantially side by side in a radial direction of the disk.

28. A recording/reproducing device for recording/reproducing information on the optical disk as set forth in claim 25, comprising:

tracking control means for controlling a light beam to scan a desired recording track, wherein:
the tracking control means performs a tracking control even when the light beam scans the wobbling pit string.

* * * * *